United States Patent [19]

Rogers et al.

[11] Patent Number: 5,557,747
[45] Date of Patent: Sep. 17, 1996

[54] NETWORK POLICY IMPLEMENTATION SYSTEM FOR PERFORMING NETWORK CONTROL OPERATIONS IN RESPONSE TO CHANGES IN NETWORK STATE

[76] Inventors: Lawrence D. Rogers, 13644 Boquita Dr., Del Mar, Calif. 92014; Roger Wellington-Oguri, 7931 Nightingale Way, San Diego, Calif. 92123

[21] Appl. No.: 80,931

[22] Filed: Jun. 22, 1993

[51] Int. Cl.$^6$ ................................................ G06F 17/60
[52] U.S. Cl. ............................ 395/200.11; 340/825.13
[58] Field of Search .................... 395/200, 51, 600, 395/200.11; 370/17; 340/825.06, 825.13

[56]  References Cited

U.S. PATENT DOCUMENTS

| | | | |
|---|---|---|---|
| 4,251,858 | 2/1981 | Cambigue et al. | 395/200 |
| 4,545,013 | 10/1985 | Lyon et al. | 395/200 |
| 5,063,523 | 11/1991 | Vrenjak | 395/200.11 |
| 5,283,856 | 2/1994 | Gross et al. | 395/51 |
| 5,287,508 | 2/1994 | Hejna, Jr. et al. | 395/650 |
| 5,315,580 | 5/1994 | Phaal | 370/17 |
| 5,365,514 | 11/1994 | Hershey et al. | 370/17 |

OTHER PUBLICATIONS

Schonberg, Edmond, Gerhardt, Mark and Hayden, Charlene, "A Technical Tour of Ada," *Communications of the ACM*, Nov. 1992, vol. 35, No. 11, pp. 43–52.

*Primary Examiner*—Richard L. Ellis

[57] ABSTRACT

An event-driven, multithreaded programmable system permits the network system operator to write concurrently-executing network policies for causing operations to be performed on a computer network in response to changes in state of the computer network. Changes in state are reported to the policy implementation system by monitors interfaced with the network operating system. A policy interpreter scans, screens and parses the network policy statements and builds data structures for managing the multithreaded system in response to state changes supplied by the monitors. The policy interpreter executor issues commands to action engines which in turn cause operations to be performed on the network.

1 Claim, 9 Drawing Sheets

NETWORK POLICY IMPLEMENTATION SYSTEM FOR PERFORMING NETWORK CONTROL OPERATIONS IN RESPONSE TO CHANGES IN NETWORK STATE

BACKGROUND AND SUMMARY OF THE INVENTION

The present invention relates generally to administration systems for computer networks. More particularly the invention relates to an automated system for implementing network administration policies on local area networks and wide area networks.

Local area networks are usually managed by a network administrator who has responsibility for, among other things, making sure the network runs smoothly on a day to day basis and that the system can recover from any problems encountered. Network administrators will therefore perform regular preventative maintenance on the computer network hardware and data and will monitor the network for changing conditions in order to take specific actions in response to changing conditions. For example, at noon, the network administrator might back up certain key data (financial data, for example). In the evening, the network administrator might back up all changed data. Every Saturday the network administrator might back up all data. Thus, as can be seen, even simple preventative maintenance, such as backing up, can involve a variety of different permutations of procedures to be followed.

In performing the network administrative duties, the network administrator may also watch the network file space so that old data can be archived if the disks start becoming full. This might entail warning a user that he or she is using excessive disk space and that the user's data may need to be archived shortly, and performing the archiving operation if there is no response from the user. Alternatively, the network administrator might elect to implement a periodic archiving of data. For example, on a monthly basis the administrator may decide to archive all data that is over 120 days old.

By way of additional example, the administrator may perform data load balancing when it is discovered the some file servers are overloaded with files while others are underutilized. Similar load balancing operations may be performed on bridges, gateways and servers with respect to network traffic.

The process of deciding what regular operations should be performed are often written down in the form of policies. For example, a company may, by written policy, require that incremental backups of data are performed daily, with a complete backup performed weekly. The company may also require that file server disks be kept, for performance reasons, at less than 70% of full capacity. Typically the network administrator or a network operator working for the network administrator will be charged with carrying out these policies.

Performing the tasks dictated by a company's written policy may require the administrator or operator to monitor the state of the network and to perform a sequence of operations, depending on the state of the network as it changes. Additionally, the sequence of operations may change, depending on the outcome of previous operations performed or previous events. All of this can get quite complex and is subject to human error. Thus it would be highly desirable if the network policies could be carried out automatically by a preprogrammed series of instructions.

However, because of the inherently interactive nature of many network administration policies it has not heretofore been possible to provide computer network systems with the programming necessary to automate the network administration task.

The present invention overcomes the deficiencies found in present-day computer network operating system software in order to provide a mechanism for automating the interactive network administration process. Accordingly, the invention provides a computer network policy implementation system utilizing an event-driven, multithreaded command language, which the network administrator or network operator can use to automate the company policies regarding network administration. Using the invention, a policy can be described as a collection or set of statements that direct the concurrent or parallel execution of the computer network programs in response to changing network states as signaled by events monitored within the network. The policies specify the conditions, as represented by network states, under which certain actions should be taken.

SUMMARY OF THE INVENTION

In accordance with one aspect of the invention a computer network policy implementation system is provided for causing operations to be performed in response to changes in state of the network. The system preferably comprises a policy editor having a user interface through which a user may cause a set of instructions to be stored, to define the network policy which will set forth operations to be performed in response to changes in the state of the network. The system further comprises a network monitoring means for monitoring at least one of a predefined set of state changes in the network and for providing system state signals indicative of those changes. An action engine means is provided, through the appropriate interface, for selectively causing at least one of a predefined set of operations to be performed upon command. The policy interpreter communicates with the network monitoring means and also with the stored set of instruction. The interpreter interprets the instructions in light of system state signals in order to generate and manage multiple threads based on a predefined language. The policy interpreter manages multiple threads representing event-driven statements which are capable of executing concurrently and interactively with one another. The policy interpreter communicates with the action engine means to supply commands to cause operations to be performed in response to changes in the state of the network and in response to the stored policy.

In accordance with one aspect of the invention the predefined language includes a first mechanism to specify that an action should be initiated in response to a state signal and a second mechanism to specify that the action should be terminated in response to a state signal whether or not the action has been initiated.

For a more complete understanding of the invention, its objects and advantages, reference may be had to the following specification and to the accompanying drawings and pseudocode listing found in the Appendix.

DESCRIPTION OF THE PREFERRED EMBODIMENT

Network System Overview

Figure 1:
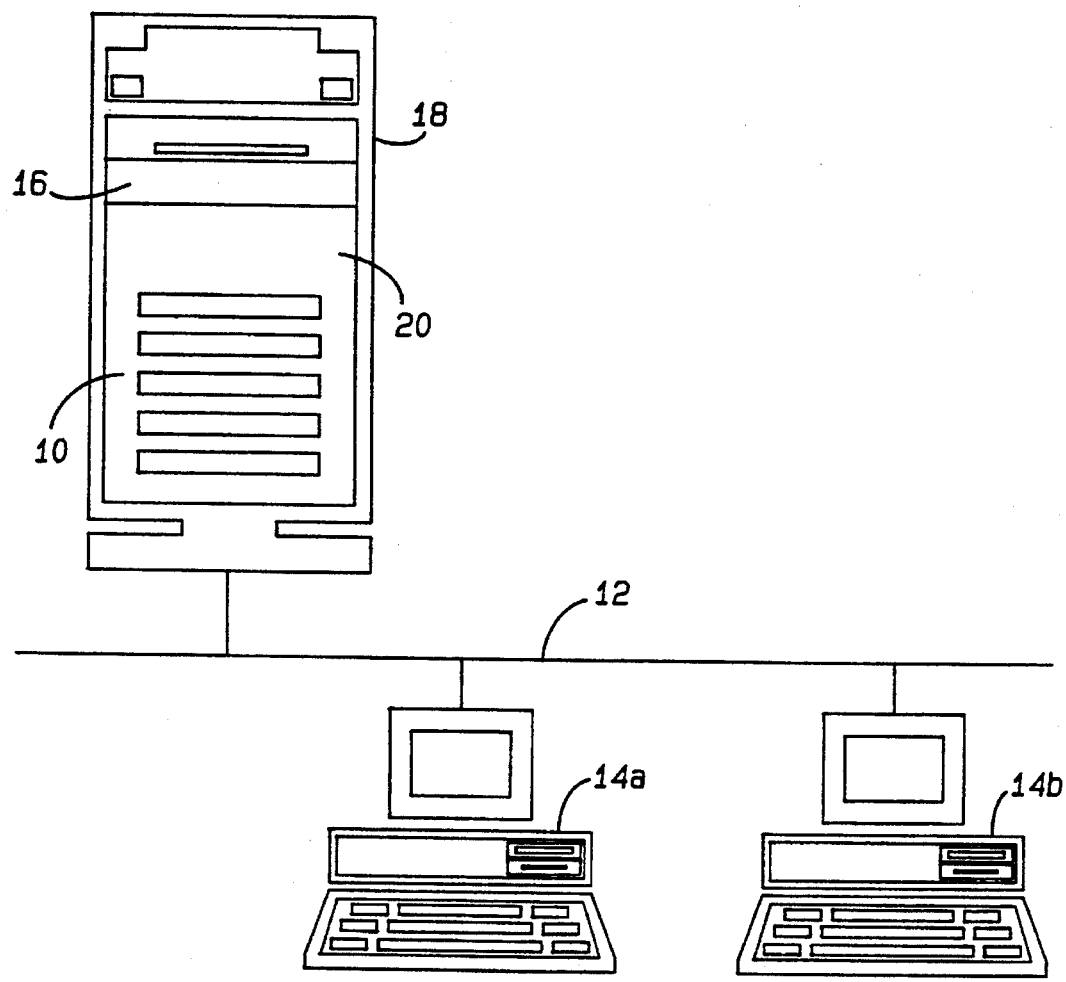
FIG. 1 is an example of a local area network, useful in understanding how the present invention may be used.

The policy implementation system of the invention may be readily adapted to work with a number of popular local area network, network operating systems and wide area network systems. For illustration purposes, FIG. 1 depicts an exemplary local area network constructed using bus topology. The invention is not limited to any particular network topology and is equally suitable to other topologies, such as ring topologies, star topologies and the like.

Referring to FIG. 1, the network system will typically include one or more file servers, such as file server 10, which is connected to the network bus or backbone communication system 12. The network system may also include a plurality of client workstations 14a and 14b which are also connected to the bus 12. It is common practice in many network systems to provide some form of archival backup. For illustration purposes a tape backup 16 is included in the network system of FIG. 1. The tape backup 16 may be integrated into the file server 10 or it may be incorporated in a separate server or workstation.

The network system employs operating system software, shown diagrammatically at 18. The operating system software controls the interaction between the file server and workstations and also typically provides a plurality of network support services, such as the ability to migrate data back and forth between the file server and the tape backup. There are a number of network operating systems in popular use today, the Novell operating system being an example. For more information about operating systems reference may be had to *Operating Systems: Design and Implementation,* Andrew S. Tanenbaum, Prentice Hall, Englewood Cliffs, N.J. 07632. For more information about the Novell operating system reference may be had to the user documentation supplied with the operating system and available from Novell, Inc., 122 East 1700 South, Provo, Utah 84606.

Although the present invention interfaces with the network operating system, much of the present invention is operating system independent. In other words, the present invention can be readily implemented to work with a wide variety of different network operating systems. In its presently preferred form, the invention relies on the operating system and the operating environment to generate certain system attributes (e.g. time of day, fullness of file server hard disk) and to provide an interface to programs which perform actions (e.g. run a backup program, delete unused files). However, the bulk of the presently preferred embodiment is not inherently dependent on any particular operating system. Thus, for example, although the presently preferred embodiment has parallel processing capability through a multithreaded processing technique that allows multiple events to be monitored and multiple actions to be taken concurrently or in parallel, it is not necessary for the network operating system to be capable of parallel processing.

Policy Interpreter Overview

The present invention provides a computer network policy implementation system which employs a unique event-driven, multithreaded command language. Using the command language, a policy is written by the network administrator or system operator. The policy consists of a set of statements that direct the concurrent execution of computer network programs in response to changing network states, as signaled by events. The policies specify the conditions, as represented by the network state, under which certain actions should be taken.

The system has three main components: monitors, which watch the network parameters for state change; action engines which are programs that carry out actions when instructed to do so by a policy; and the policy interpreter. In addition to these three components, a method of preparing and submitting policy statements is employed. In a presently preferred embodiment, the policy statements can be prepared using a text editor and submitted in the form of ASCII source code, which is submitted to the policy interpreter. The policy interpreter converts the source code into a compactly encoded tree structure representation which the interpreter executes to cause appropriate events to be monitored and to cause appropriate actions to be taken.

In the presently preferred embodiment the monitors are implemented using services provided by the existing network operating system. The program of the invention has a mechanism for interfacing to those monitors, so that the policy being executed will be notified when a particular event or state transition occurs. Similarly, the action engines employed in the presently preferred system may be existing programs for carrying out various computer assisted activities, such as performing backup. The software of the invention provides a mechanism for interfacing to these action engine programs, causing the programs to be activated or launched as needed.

The policy interpreter of the present invention executes the instructions specified in the policy language. This language is highly concurrent and deals with multiple changing events. As more fully described below, the policy interpreter carries out the functions described in the policies by traversing a compactly encoded tree structured representation of the policy. This representation is the executable form of the language. The policy source language is translated into this executable form using parsing and scanning syntax mechanisms which also perform syntax and semantic error detection.

The interpreter works within a multithreaded environment. The interpreter works by repeatedly executing an interpretation cycle. Each interpretation cycle works on a fixed snapshot of the policy state. In other words, the cycle insures that the attribute values and local variables seen by the interpreter do not change while conditions are being evaluated.

The following will describe the presently preferred software implementation in greater detail. In addition, an overview of the event-driven, multithreaded command language is also presented. More complete details of the preferred interpretation cycle and of the syntax and grammar of the policy language may be found in the Appendices.

The presently preferred network policy implementation system is a computer-implemented software system which can reside virtually anywhere on the network. Thus for illustration purposes the network policy implementation system software 20 is shown as running on file server 10. It could instead be run on one of the workstations. The network policy implementation system software 20 may be a separate, stand-alone application programming or it may be embedded in and form a part of the network operating system 18.

In the presently preferred embodiment the network policy implementation system software may be run as a "background" process on the file server or workstation machine being used for other applications. As such, the network policy implementation system should make minimal use of the CPU whenever it is not interacting directly with the user. Ideally, the user would never notice a pause caused by background operation of the network policy implementation system, due to the speed of present-day CPUs.

Figure 2:
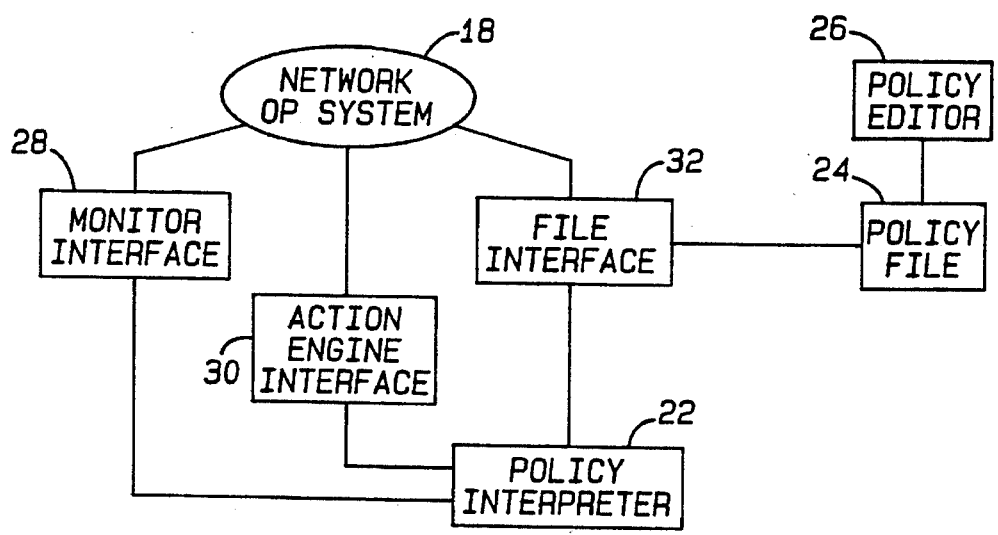
FIG. 2 is a block diagram showing the basic building blocks which comprise the presently preferred network policy implementation system of the invention.

The basic building blocks which comprise the presently preferred network policy implementation system are illustrated in FIG. 2. In this regard, FIG. 2 is merely intended to be an example for purposes of teaching how to implement a system using the principles of the invention.

Referring to FIG. 2, at the heart of the network policy implementation system is the policy interpreter. It is the function of the policy interpreter to respond to network policy instructions from the network administrator or system operator and to interpret, coordinate and implement those instructions, at the proper time and under the proper conditions based on actual system operation. In FIG. 2 the policy interpreter is depicted generally by reference numeral 22. A more detailed analysis of the policy interpreter will be given below.

The network policy that is established by the network administrator or system operator is stored in a policy file 24. Policy file 24 may comprise a single file containing one or more policy statements or instructions, or it may comprise a plurality of files each containing one or more policy instructions. In the presently preferred embodiment this network policy may be in the form of a plurality of ASCII policy statements which can be created and stored in the policy file by a policy editor 26. The policy editor may be in the form of a simple text editor, such as those used for creating source code for a conventional computer language compiler. In a more elaborate system the policy editor may include an integrated graphical user interface system, providing the usual panoply of check boxes, menus, dialog boxes and the like in order to elicit network policy statements from users who are not acquainted with writing conventional computer language source code.

The policy interpreter 22 communicates with the network operating system through a series of interfaces. More specifically, the policy interpreter communicates through a monitor interface 28 with one or more of the monitor services provided by the operating system. Monitor services include such functions as monitoring time of day and date, monitoring the quantity of data stored in the file server hard disk and the like. In a similar fashion the policy interpreter communicates through action interface 30 with the network operating system. The action interface 30 provides one or more action engines used to request the operating system to initiate actions, such as running tape back up programs, deleting files, moving files, providing messages to system users and so forth. A file interface 32, utilizing the existing network operating system file handling mechanisms, provides policy interpreter 22 with the ability to open and read from policy file 24.

Policy Interpreter Details

Figure 3:
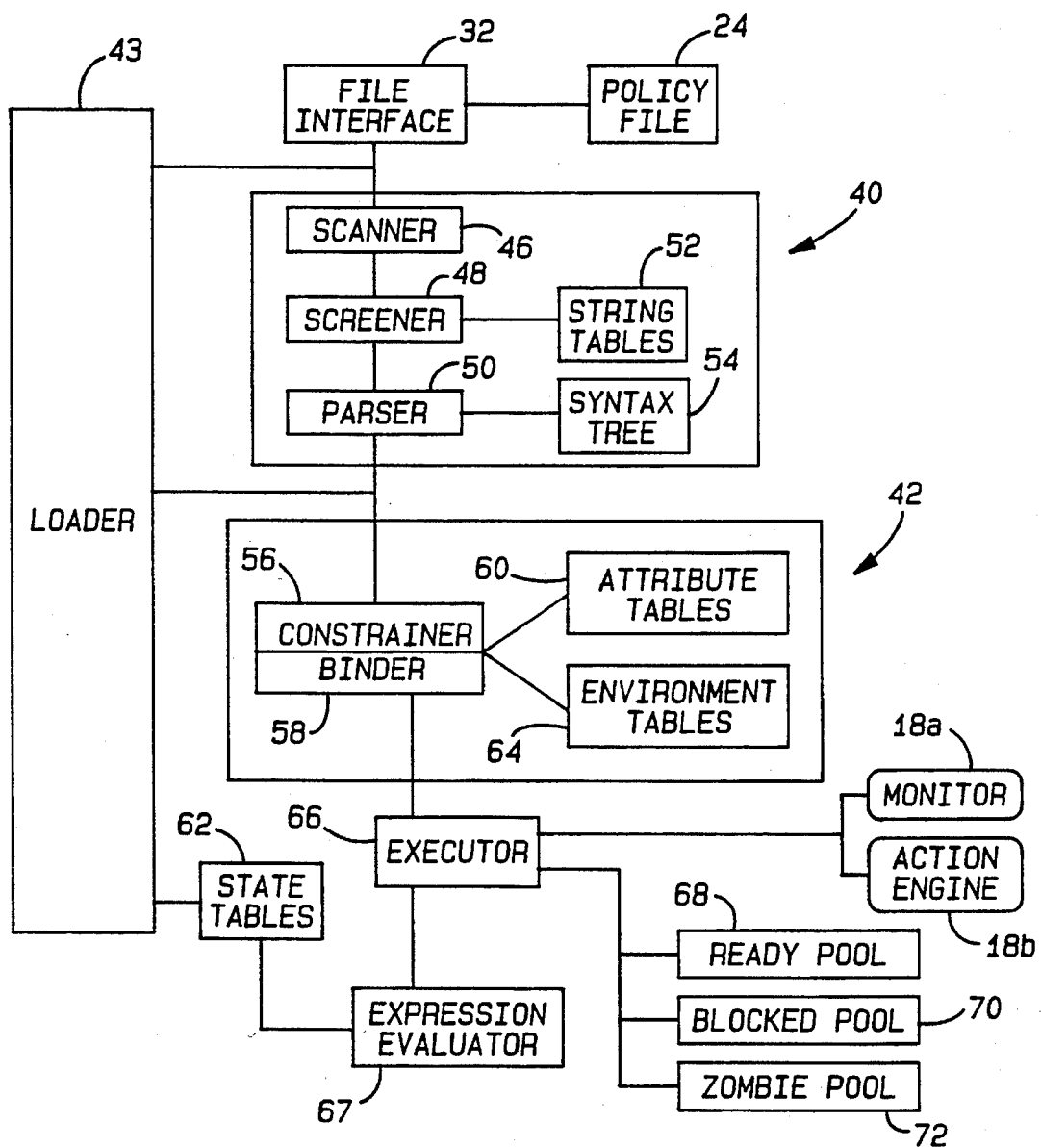
FIG. 3 is a block diagram showing the policy interpreter and its associated modules in greater detail.

The policy interpreter, implemented as a computer software program, is preferably implemented as an interconnected arrangement of software component objects or modules illustrated in FIG. 3. Referring to FIG. 3, policy interpreter 22 has access to the policy file 24 through the existing network operating system file system. In other words, the policy interpreter 22 is coupled to the policy file 24, and is thereby able to receive a stream of policy statements from the policy file, using the existing network operating system file handling interface.

The basic function of the policy interpreter is to receive the input stream of policy statements (e.g. in ASCII format), to parse, check and interpret those statements, to assign a meaning to the statements in terms of the actual network configuration and in terms of the actual network conditions being monitored, and to cause appropriate actions to be taken based on those statements. Accordingly, the policy interpreter can be viewed as comprising a syntax component 40, a semantic component 42, a loader component 43 and an execution component 44, as illustrated.

The syntax component 40 comprises a scanner module 46, a screener module 48 and a parser module 50. The screener module utilizes a String Table, discussed more fully below. As will be explained, these three modules work together to build a syntax tree which represents the user-supplied policy statements in a more efficient data structure used by the policy interpreter.

The semantic component 42 comprises a constrainer module 56 and a binder module 58. The constrainer module performs semantic checking, while the binder module resolves addresses. These modules work in conjunction with several data structures, described below, which comprise the Attribute Tables 60, State Tables 62 and Environment Tables 64. Together, the syntax component 40 and semantic component 42 comprise a policy loader 43 which locates and loads the policy file and readies it for execution by the execution component 44.

The loader component 43 coordinates between the scanner component, the screener component, the parser component, the constrainer component, the binder component and the execution component.

The execution component 44 comprises executor module 66 and its associated expression evaluator 67. The executor module communicates with the monitors 18a and the action engines 18b of the network operating system, via monitor interface 28 and action interface 30, respectively. The executor maintains several data structures, referred to herein as the Ready Pool or Ready Queue 68, the Blocked Pool or blocked queue 70 and the Zombie Pool or zombie queue 72.

The presently preferred embodiment of the policy interpreter works in conjunction with a predefined policy language through which the user and the policy implementation system of the invention communicate. A detailed description of the presently preferred policy language is set forth below.

As more fully explained below, the policy interpreter and policy language components of the present system work together to provide policy implementation control over the computer network not heretofore possible. Accordingly, for a complete understanding of the scanner, screener and parser modules of the syntax component 40, reference may also be had to the description of the policy language set forth below. The following will present a more detailed view of the presently preferred syntax component, semantic component and execution component.

The Syntax Component

As explained above, using the existing network operating system file handling mechanisms, the file interface 32 couples the policy file 24 with the policy interpreter 22. More specifically, when a user submits a policy to be implemented, the policy is identified by a name. File interface 32 takes the policy name, locates the file associated with that name, opens the file and returns a buffered input stream for the file.

Scanner 46 reads the input stream and breaks it up into strings constituting the lexical units of the policy language. Scanner 46 also assigns each string to the appropriate token class (e.g., Identifier, Integer, Comment, etc.). In other words, the characters in the source input stream are grouped by the scanner into a stream of tokens in which each token represents a logically cohesive sequence of characters, such as an identifier, a keyword, a punctuation character or the like. The character sequence which forms the token is called the lexeme for the token.

Screener module 48 takes the lexemes from scanner module 46 and converts them into more compact tokens, e.g. integer numbers, that the remaining program can process without the need to perform time-consuming string comparisons on each lexeme. Screener module 48 simply discards comment and white space lexemes. Using String Table 52 screener 48 converts every other lexeme string to a token ID, which is a unique integer representing the lexeme string. Screener 48 packages the token class and token ID together with the source file line and column numbers (for use by the parser module 50 in describing errors). The packaged token structure is then passed to parser module 50. As will be seen, String Table 52 implements two functions. It maps unique lexeme strings to unique token ID integers, and it provides a reverse map for translating the token ID integers back into lexeme strings.

Figure 4:
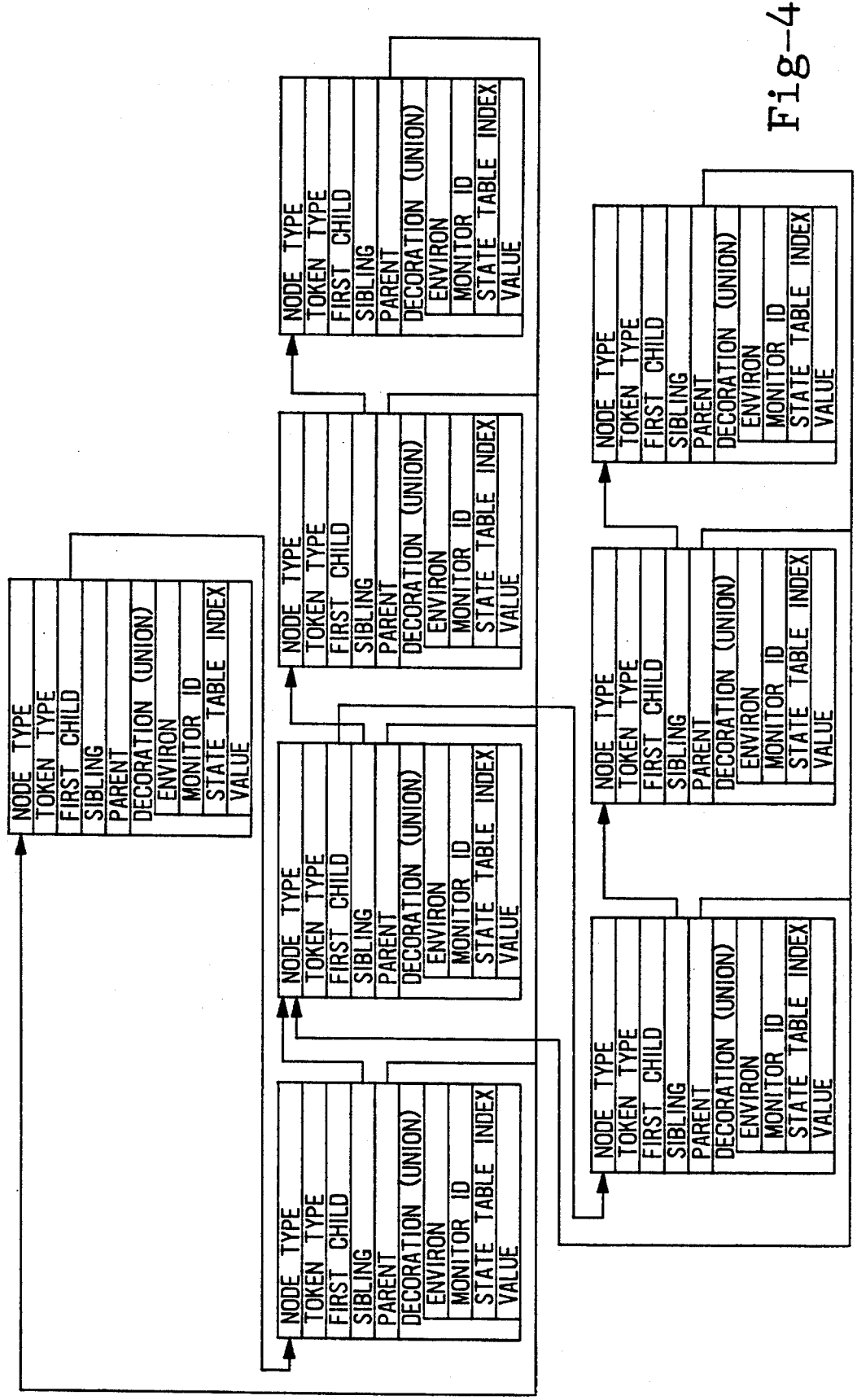
FIG. 4 is a data structure diagram showing the presently preferred structure of the syntax tree as seen by the parser-constrainer modules.

Parser module 50 takes the token structures passed to it by screener 48 and uses them to build an Abstract Syntax Tree 54. This Abstract Syntax Tree is the intermediate representation of the user-supplied policy that will be used during the semantic and execution component phases. Once the Abstract Syntax Tree is constructed, the policy file is no longer needed and can be closed. An illustration of the presently preferred data structure used to implement syntax tree 54 is shown in FIG. 4.

The Semantic Component

Once the Abstract Syntax Tree has been built the semantic component 42 takes over. The presently preferred semantic component includes a constrainer module 56 and a binding module 58. The semantic component works in conjunction with several data structures or tables, namely the Attribute Tables 60, the State Tables 62 and the Environment Tables 64.

Constrainer module 56 is responsible for performing static semantic checking. This is done by traversing the Abstract Syntax Tree and performing those semantic checks that can be done without executing the policy statements represented by the syntax tree. The presently preferred embodiment makes the following static semantic checks:

1. The policy file includes at least one policy.
2. All policies in an OR list are qualified with WHEN conditions at the top level. (The OR and WHEN keywords are described more fully in the Description of the Policy Language below).
3. Identifiers are not multiply declared (except for the case of multiple monitors declaring attributes of the same name, which is allowed in the presently preferred policy language).
4. All identifiers used in WHEN and WHILE conditions are declared in the policy's environment, as monitor attributes, local variables, enumerated type values or one of the following Boolean conditions: TRUE, FALSE or UNKNOWN.
5. All variables passed as argument values are declared in the appropriate environment (callers for inputs and callees for outputs).
6. All subpolicy invocations use a name declared as a subpolicy.
7. The types of all condition operands are consistent with their operators.
8. Integer, date and time constants are within appropriate ranges.

Figure 5:
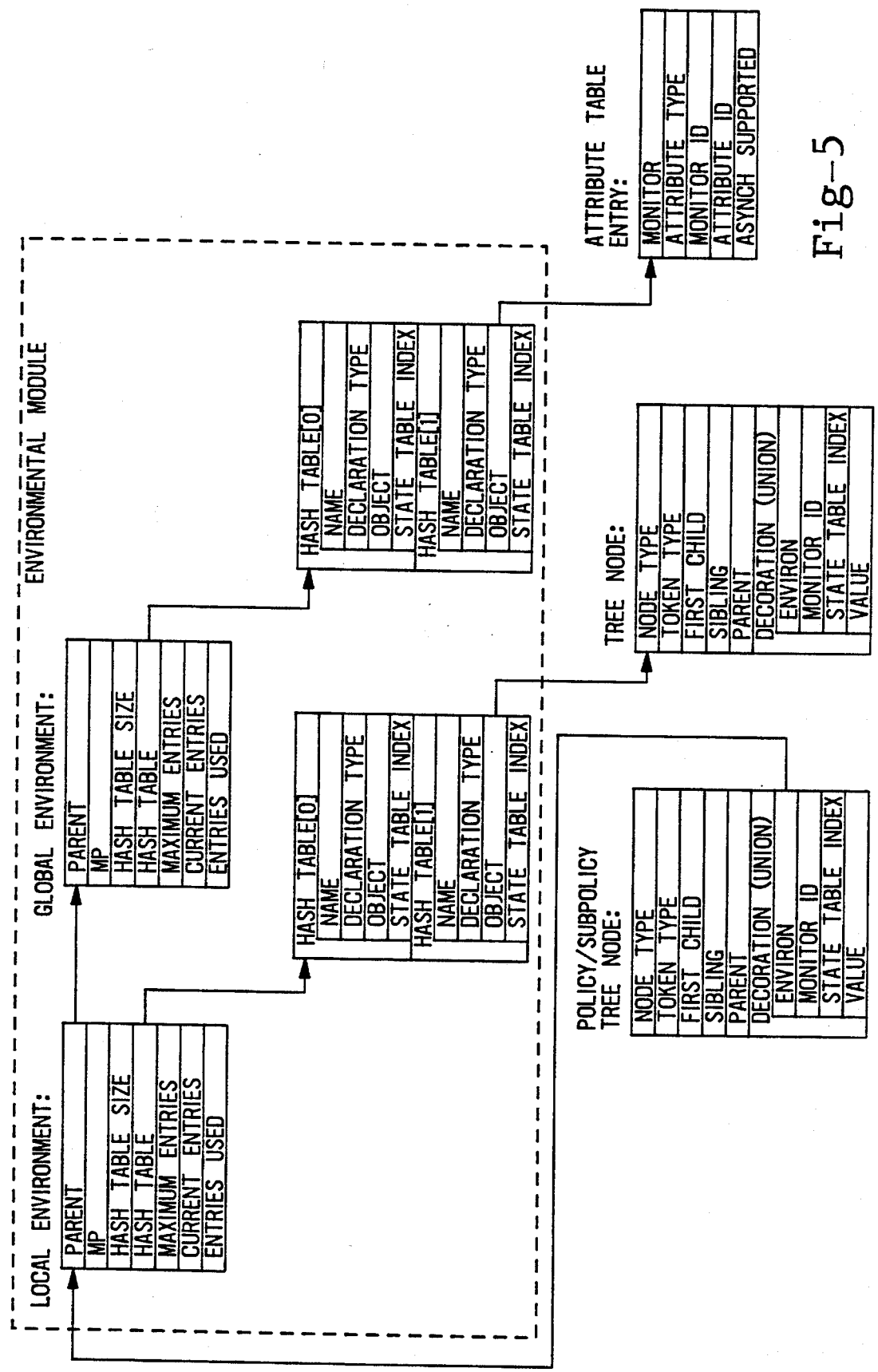
FIG. 5 is a data structure diagram illustrating the various Attribute Tables, State Tables and Environment Tables utilized by the constrainer-binder modules.

To perform the static semantic checking constrainer 56 builds Environment Tables 64. These tables are used in determining whether variables are used consistently. The Environment Tables map names to policy language objects. One view of the data structure of the presently preferred Environment Tables is illustrated in FIG. 5. As illustrated, there is one global Environment Table for each active policy file and one local Environment Table for each subpolicy in the file. These Environment Tables are built during the first pass of the constrainer module over the Abstract Syntax Tree. Preferably Environment Tables are implemented as hash tables of (token ID, object) pairs, where the object is either an Abstract Syntax Tree node or an Attribute Table entry.

In addition to performing static semantic checking, constrainer 56 takes the Abstract Syntax Tree built by parser 50 and completes all the processing on this tree that is done at load time. This processing includes establishing communication with network system monitors. Establishing communication with network monitors involves binding to the monitors and building Attribute Tables 60. When binding to a monitor has been declared in a policy (i.e., a monitor such as system time and date has been invoked), binder module 58 causes the specified monitor to send information about itself. This is done by issuing the appropriate network operating system request to the monitor, which then responds by describing all attributes which it monitors. Most network operating systems in use today provide this data which can be accessed by a suitable interface. Binder module 58 enters the requested information into the Attribute Tables 60. The presently preferred date structure for implementing the Attribute Tables are shown in FIG. 8. To put FIG. 8 into context, reference to FIGS. 4–7 may be helpful.

In addition to building Environment Tables and Attribute Tables, the semantic component 42, and specifically the constrainer module 56, checks the types of all variables described in the environment. The loader component coordinates between each of the other components making sure that they are invoked at the appropriate time. In addition, the loader component builds the State Table 62 from information in the Environment and Attribute Tables as the control is passed to the execution component from the semantic component. The State Table contains one entry for each variable that is used in a policy. Whenever the executor instigates a named subpolicy, the loader builds the local State Table for that subpolicy. This is in contrast to the Environment and Attribute Tables, which contain an entry for each variable that is defined. Like the Environment Tables, the State Tables are organized into global and local State Tables. There is a single global State Table for each policy file instance and a separate local State Table for each named subpolicy instance. The presently preferred data structure for implementing the State Tables is shown in FIG. 8.

The Execution Component

After the syntax component 40 and the semantic component 42 have completed their respective jobs, all necessary data structures have been built and the policy statements are now ready for execution. The presently preferred embodiment employs multithreaded parallel processing. Thus multiple policy statements are handled concurrently at run time. Each policy statement, or policy instance, is treated as a separate thread. All threads which are in a condition to be processed are placed on a Ready Queue in Ready Pool 68. This may be viewed as a step in initializing the execution structure or dynamic structure of each policy instance, which is one function of the execution component 44.

The execution component 44 employs an executor module 66 which manipulates the Ready Queue structures. The executor module is also in communication with the data structures created by the syntax and semantic components, namely syntax tree 54, Attribute Tables 60, State Tables 62 and Environment Tables 64. The executor module works by repeatedly executing an interpretation cycle shown in FIG. 9a. Recall that the policy implementation system software 20 is likely running on the server although it can be run on one of the workstations (e.g. workstation 14b) which may also be running other programs as well. If there is nothing else running on the server or workstation processor, the interpretation cycle could continually execute. However, a more likely scenario is for the interpreter to periodically execute one interpretation cycle and then pass control back to other applications. For example, the interpreter may execute one interpretation cycle every 10 seconds or so.

During one interpretation cycle, the policy interpreter, specifically executor module 66 sees a fixed snapshot of the policy state. This is done so that attribute values and local variables seen by the executor module do not change as conditions are being evaluated. This guarantees, for example, that the WHEN condition (see policy language description below) is idempotent, that is,

|  | WHEN A X |
| --- | --- |
| and | WHEN A WHEN A X | have the same semantics.

Figure 9A:
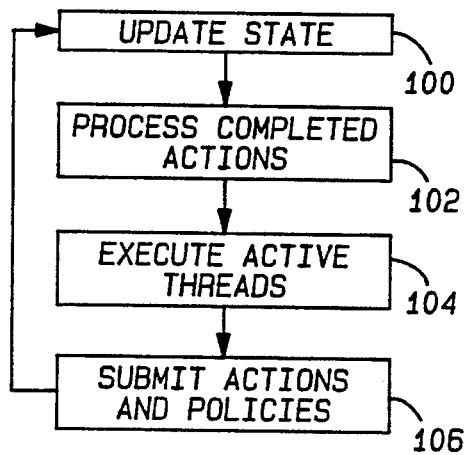
FIG. 9a is a flowchart diagram of the interpretation cycle.

To accomplish this, each interpretation cycle goes through the three stages illustrated in FIG. 9a. Referring to FIG. 9a, the interpretation cycle first updates the system state (step 100) and processes completed actions (step 102), then executes all active threads (step 104) and then submits actions and policies (step 106). In the process of performing these steps, some variables will change, monitors will start monitoring attributes and monitors will stop monitoring attributes.

The values of particular attributes are only required when a policy is waiting on a condition that is dependent on a particular attribute. The executor signals the appropriate monitor to start monitoring an attribute the first time it is needed and signals the monitor to stop monitoring the attribute when it is no longer needed.

There are three ways in the presently preferred embodiment that variables may change during execution of a policy. First, system attributes or conditions may change as a result of changes in the system being monitored. Second, local variables may change based on outputs received from a completing action or policy. Third, local variables may be assigned a thread ID when an action or policy is submitted. The interpretation cycle is carefully constructed to insure that system attributes and local variables are changed at the proper time, so that a fixed snapshot of the policy state is maintained.

Specifically during each interpretation cycle, the system state is updated in one of two ways. For conditions being communicated asynchronously, the monitor interface 28 is told to go ahead and make all updates that it has queued up since the last interpretation cycle. For polled attributes, the executor module goes through each State Table and requests the current value of each active attribute via the monitor interface. To update local variables that receive outputs from a completing action or policy, the queue of actions and policies (i.e. submitted policies) that have been completed since the beginning of the prior interpretation cycle are processed. Their output arguments are processed and used to update the State Tables and their threads are placed on the Ready Queue in Ready Pool 68. The updating of the state to reflect the assignment of newly submitted thread IDs occurs at the very end of the interpretation cycle. Thus local variables which are assigned a thread ID when an action or policy is submitted are not updated until the next interpretation cycle.

Figure 9B:
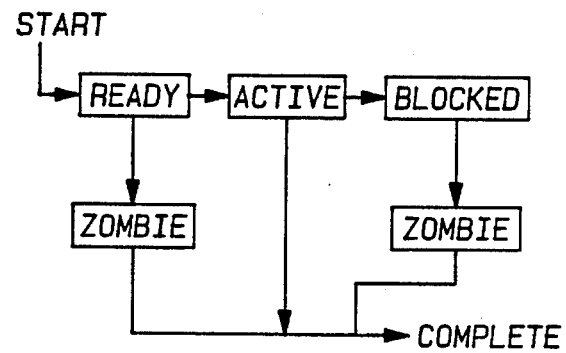
FIG. 9b is a state diagram illustrating how the execution of threads is handled in the presently preferred embodiment.

Once the states have been updated for all applicable system attributes and for all applicable local variables, the execution of active threads begins. During execution, the threads may go through one or more of the states illustrated in FIG. 9b, namely Ready, Active, Blocked and Zombie. For a more complete understanding of how this is accomplished using the data structures, see FIGS. 10a–10c, which show how pointers are readjusted to move from the unallocated state (FIG. 10a) to the ready state (FIG. 10b) to the Zombie state (FIG. 10c).

In this regard, the executor module maintains a pool of threads that are ready for execution (Ready Pool 68). At each interpretation cycle, the executor processes all threads in the pool and continues until the pool is empty. The single thread being interpreted at any one time is said to be Active. Threads in the Blocked state cannot be further interpreted until something else occurs. Threads can be Blocked waiting for completion of subthreads, waiting for a change in an attribute value, and so forth. A thread is in the Zombie state when it has been terminated (e.g. by a WHILE guard or aborted) but cannot complete until its subthreads complete. This will be explained in more detail below.

Threads are essentially process descriptors which each include a pointer to the current node in the Abstract Syntax Tree as well as a state variable indicating whether the thread is Ready, Active, Blocked or Zombie. Executor 66 interprets each thread in the Ready Pool 68, one at a time in serial fashion. Interpreting an Active thread consists of traversing the Abstract Syntax Tree, starting at the first node pointed to by the thread descriptor, and taking the appropriate action. For a detailed explanation of the action taken reference may be had to the section below describing the policy language. This interpretation for a given active thread proceeds as follows:

1. A WHILE node is entered. In this case, two new threads are created, one for the WHILE condition and one for the WHILE policy body. Each of these threads is placed in the Ready Pool or Queue 68 and the old thread becomes blocked on completion of its subthreads.
2. A WHILE condition is evaluated. If the WHILE condition is non-false it is placed in a pool that will become the Ready Queue at the beginning of the next interpretation cycle. Otherwise, the WHILE condition thread is completed and the thread of the policy it was guarding is terminated. In this regard, terminating a thread does not consist merely of removing the thread from any data structures and returning its resources. The Abstract Syntax Tree corresponding to the thread must be traversed, causing subthreads to be terminated as well.
3. A WHEN condition is evaluated. If the WHEN condition is non-true, the thread is placed in the pool to be added to the Ready Queue for the next interpretation cycle. If the WHEN condition is true, a check is made to see if the parent of the WHEN condition is in an OR list node. If so, all of the sibling threads of the WHEN condition are terminated. In either case, execution of the thread proceeds with the WHEN policy body.
4. An AND or OR list node is entered. In this case, a new thread is created for each child node. Each of these threads is placed in the Ready Pool. The parent thread enters a Blocked state, where it remains until its child threads complete.
5. A named subpolicy invocation node is entered. In this case, a new thread is created for the new subpolicy instance, and that instance is interpreted. The old thread enters a Blocked state, where it remains until its child thread completes.
6. A SUBMIT node is entered. In this case, a new thread is created for the new policy or action instance. This thread is placed in a pool of threads to be submitted at the end of the interpretation cycle, after all threads have been processed. Interpretation of the old thread continues if the SUBMIT node was marked as being an "independent" SUBMIT. Otherwise, the thread enters a Blocked states, where it remains until its child thread completes.

For a more detailed understanding of the interpretation cycle reference may be had to the pseudocode program listing in the Appendix.

In the presently preferred embodiment the interpretation cycle, thus described, uses multithreaded capability to respond to system events and to control the taking of resulting action. Thus the presently preferred embodiment directs the flow of actions to be taken in response to events. However, the presently preferred embodiment does not, itself, actually carry out the actions which it controls. Rather, the executor module uses the SUBMIT mechanism to instruct other programs on the system to take action and uses the ABORT mechanism to request those programs to terminate action.

Thus, while the executor implementing the interpretation cycle is able to terminate threads (representing policy statements), it does not terminate actions once those actions have been set in motion. This is an important feature, the decoupling of "action engine" from "policy." One important advantage of this decoupled arrangement is that the individual action engines, responsible for carrying out requested actions, such as backing up a disk, remain in complete control over the actual physical process. Thus the termination of a thread calling for an action like tape backup to be aborted would not cause the tape backup process to halt in midstream, which could result in loss of data. Rather, the backup process would be permitted to execute to a convenient breaking point and tend to any housekeeping details needed.

Actions and policies that become ready for submittal during an interpretation cycle are held until the end of the interpretation cycle. This is done to ensure that the policy state does not change during an interpretation cycle. When actions and policies are submitted, the action interface 30 causes the appropriate action engine to perform its preprogrammed tasks under network operating system control, and the associated thread is removed from the pool of pending submittals.

In the presently preferred embodiment there are three possible ways for a thread to complete. A thread can complete through a "natural" completion process, which occurs when the thread progresses to the end of the policy language construct that created it. In the presently preferred policy language every policy language construct except for the "REPEATEDLY" construct has a natural completion.

A thread can also complete by being terminated under various conditions. Specifically, completion of either thread associated with a WHILE construct causes termination of the other thread. In a like fashion, when one of the WHEN guards associated with OR list siblings becomes TRUE, the other OR siblings are terminated. In addition, it may be desirable to allow the user to terminate a policy as an alternative to aborting it. Terminating a thread causes all child threads, except for those associated with a SUBMIT, to be terminated as well. The thread enters a Zombie state and does not complete until all of its subthreads (including those associated with nonindependent submittals) complete.

Third, a thread can complete by being aborted using an ABORT command that is executed either as part of a policy, or as a direct result of a user request. Aborting a thread causes all child threads (except for those associated with an Independent Submit) to be aborted as well. In particular, aborting, unlike termination, can affect actions that have been submitted. As in the case of termination, an aborted thread does not actually complete until its child threads complete.

Policy Language

Although it is possible to implement the invention using a variety of different language constructs, the presently preferred policy language will be described below. In general, the presently preferred policy language is the component of the system which allows the user to express network policies in a precise, succinct and robust fashion. In this regard, a policy consists of a set of actions along with conditions that control the circumstances under which each action is performed. The simplest policy consists of a single action. An action is an imperative procedure, such as "make a backup copy of data" or "move data off line." As discussed above, the policy interpreter initiates actions by notifying the appropriate action agent or action engine via the action interface 30. As noted above, the presently preferred policy interpreter does not itself execute actions.

Multiple policies can be combined into three types of compound policies, namely AND lists, OR lists and SEQUENCE lists. An AND list is a list of two or more policies executed in parallel. An OR list is a list of two or more policies, only one of which is allowed to execute. A SEQUENCE list is a list of two or more policies that are executed sequentially.

By default, any policy is executed only once. However, any policy can be qualified with the keyword REPEAT- EDLY, in which case the policy is continually reexecuted, until terminated by a WHILE guard, discussed below.

Policies can be augmented with Boolean conditions called GUARDS. In the presently preferred embodiment there are two types of guards. A WHEN guard is a Boolean expression acting as an entrance condition. When the policy is activated, it waits until the guard is TRUE before continuing execution. A WHILE guard is a Boolean expression acting as an exit condition. In this case, the guard does not hold up the start of execution of the policy, but instead controls its termination. If the WHILE guard ever becomes FALSE, the policy is immediately terminated. When a policy is terminated, all subpolicies, including any named policies that were invoked from the policy being terminated, are also terminated. However, terminating a policy does not terminate any actions or policies that were invoked with a SUBMIT command, described below.

A condition is a Boolean expression about the current state of the system being monitored. At any point in time, a condition can have the value TRUE, FALSE or UNKNOWN. Thus, the present system implements a form of tristate logic. As will be seen, the use of tristate logic is quite important, since most networks are distributed systems and it therefore cannot be guaranteed that system components will be in constant communication with one another. Conditions are typically defined in terms of system attributes. Each attribute is a time-varying measurement of some basic characteristic of the system, such as the time of day or the amount of free space on a disk volume. Attributes have a type associated with them. The presently supported types are Integer, String, Date, Time, Boolean and Enumerated. The current value of each attribute is determined through the use of monitors. Each monitor supplies that values for a set of related attributes. For example, a date/time monitor might provide values for the date, the month, the day of the month, the day of the week, the time of day, etc. It is also possible for monitors to supply a system condition based on comparison of the system attribute to a predetermined value, such as whether or not the free space on a disk volume is greater than some predetermined value.

Like conditions, attributes can also have the value of UNKNOWN, regardless of the attribute's type. An attribute will have the value UNKNOWN if its monitor reports it to be unknown (e.g. if it is monitoring a removable device that is not currently mounted), or if the monitor fails to report (e.g. the connection to the monitor has been broken).

In addition to attributes, a condition can also involve variables. Variables exist by virtue of being either a formal input parameter or an output returned from a subpolicy or action. The scope of any variable is limited to the named policy in which it occurs. A variable that has not yet been assigned a value (e.g. an output from an action that has not yet completed) has the value UNKNOWN.

Communication between an action and the rest of the policy is achieved with action parameters. Parameters are classified as either inputs or outputs. Input parameter values are all determined before initiating the action. Output parameter values are generally available only when the action completes. All parameter values are passed as strings. Conversion between strings and attributes of other types allow attributes to be passed as input parameters and output parameters to be compared with attributes.

When a named policy starts executing, it has a single execution thread associated with it. Because each subpolicy of an AND list is executed in parallel, an AND list creates multiple execution threads, one for each policy in the list. One other construct, SUBMIT, creates a single additional execution thread. If SUBMIT is qualified with the keyword INDEPENDENT, the two threads execute independently in parallel. Otherwise, the thread associated with the submitter waits on the SUBMIT and does not continue execution until the SUBMIT completes. Both actions and policies can be invoked via SUBMIT. There are two possibilities for the object of SUBMIT: an action and a policy. Submitting a policy has the same effect as if the user submitted that policy, either on the same or on a different instance of the policy interpreter. Specifically, a separate global environment is constructed for the submitted policy. When an action or policy is submitted, it assigns an integer ID. This ID can be used in a parallel thread to abort the action or policy, if desired. The intent in aborting an action is to cause it to cease immediately, or to cancel the request to execute it if the action engine has not yet started it. However, the aborting is actually done by the action engine; all the policy interpreter does is to notify the action engine and thereby request the abort. When a policy is aborted, all actions and policies it submitted (other than those indicated as INDEPENDENT) are aborted also. This is in contrast to a policy being terminated. Terminating has no effect on any policies or actions it has submitted.

The presently preferred policy language involves three categories of scope—universal, global and local. Universal scope is external to the policy interpreter and contains the names known in the environment in which the interpreter runs. A policy only makes use of names in the universal scope; it does not add any. (However, an action invoked by a policy could add or modify names in the universal scope).

Monitors, actions and policy files must have names in the universal environment in order to be referred to in a policy statement. Loading a policy file creates two more categories of scope, namely global and local. There is a single global scope associated with each policy file. The following names are declared in this single global scope: (global) monitor names, attributes supplied by monitors declared in the policy file, enumerated types supplied by monitors declared in the policy file, TRUE, FALSE and UNKNOWN values, and policies contained in the policy file. Monitors are given a global name in addition to their universal name, because there is a frequent need to refer to a monitor name in a policy, and the universal name may be excessively long and/or lexically illegal as an identifier.

With the exception of multiple monitors providing attributes and/or enumerated type values with the same name, the same name cannot be declared multiple times in the global scope. If an attribute name is declared by more than one monitor, any use of that name in a policy must be qualified by the monitor name. If an enumerated type value is declared by more than one monitor, all such values are considered to be the same. For example, multiple monitors can provide an enumerated attribute with Friday as a possible value, and all such occurrences of Friday are equal if compared.

Each named policy creates a local scope, which is limited to the lexical extent of that policy. The following names are declared in each local scope: formal input parameters to the policy; output arguments from submit, abort and named policy invocations that are lexically contained in the policy; and the name given to the ID returned by submit, if it is given a name. In the case of local scopes, it is acceptable for a name to be multiply declared. All such declarations are considered to refer to the same variable. Since all names in the local scope are associated with string types, no type ambiguity can arise.

For the global and local environments, the binding of names to the objects they name is done when the environment is created. That is, global names are bound when the policy file is loaded and local names are bound when the named policy is invoked. The binding of universal names, however, is deferred as long as possible, and may in fact change as the policy executes. For actions and policy files, the name is bound when the action or policy file is submitted. If the action or policy file is resubmitted, the name is rebound. Each (universal) monitor name used in a policy file is bound when the policy file is loaded. However, the connection to the monitor may be lost while the policy is being interpreted. In this case, the policy interpreter's monitor interface attempts to reconnect to a monitor with the appropriate name. Policy interpretation continues regardless of whether the reconnection is successful. Any attributes provided by that monitor will have the value UNKNOWN until a successful reconnection is made. Rebinding to a monitor does not affect the global environment. This implies that if a monitor is terminated and replaced with a newer version of the monitor that provides additional attributes, these additional attributes will not be known to the policy unless the policy file is closed and reloaded.

For additional description of the presently preferred policy language see Appendix A which includes a description of operators, operator preference, lexical grammar, screening, abstract syntax, concrete syntax, static semantics and dynamic semantics, as well as an example of the language in use.

Further Details of The Presently Preferred Software Implementation and Data Structures As noted above, the policy interpreter maintains numerous data structures that are interconnected in different ways for different purposes. The following will analyze these structures as they are seen and utilized by the various modules of the interpreter, described above.

FIG. 4 depicts the structure of the Abstract Syntax Tree, which comprises a collection of linked tree nodes. The Abstract Syntax Tree is built by the parser 50 and is traversed twice by the constrainer 56. As illustrated, each tree node is, itself, a data structure for containing information such as Node Type, Token Type, First Child, Sibling, Parent, Decoration, Environment, Monitor ID, State Table Index and Value. As illustrated an Abstract Syntax Tree node may have any number of children, but only the pointer to the First Child is stored in the node. Other children are accessed through the Sibling chain, starting with the First Child.

As the constrainer makes its first pass over the Abstract Syntax Tree, it enters information into the Environment. On the second pass, it looks up information in the Environment, both to verify constraints and to add information in the Decoration field of certain notes that the policy loader 43 and expression evaluator 67 use when executing the policy.

FIG. 5 illustrates the data structure of the Environment module and its use by the Constrainer 56. The data structures indicated inside the dashed lines are internal to the Environment module and are manipulated only indirectly. The basic Environment unit consists of an Environment header and a hash table. There is one global Environment for each loaded policy and one local Environment for each loaded subpolicy. Each local Environment has a pointer to its parent global Environment. The Environment's hash table maps names (represented by tokens) to a (type, object, State Table index) triple. The object is either an Abstract Syntax Tree node or an Attribute Table entry; the type is used by the constrainer 56 in verifying that the policy is semantically meaningful, at least in those respects that can be checked statically. The State Table index, forming a part of the hash table, is calculated for use during execution by the expression evaluator 67. The constrainer stores the appropriate State Table index in the Decoration field of each Identifier tree node that will be evaluated during execution.

Figure 6:
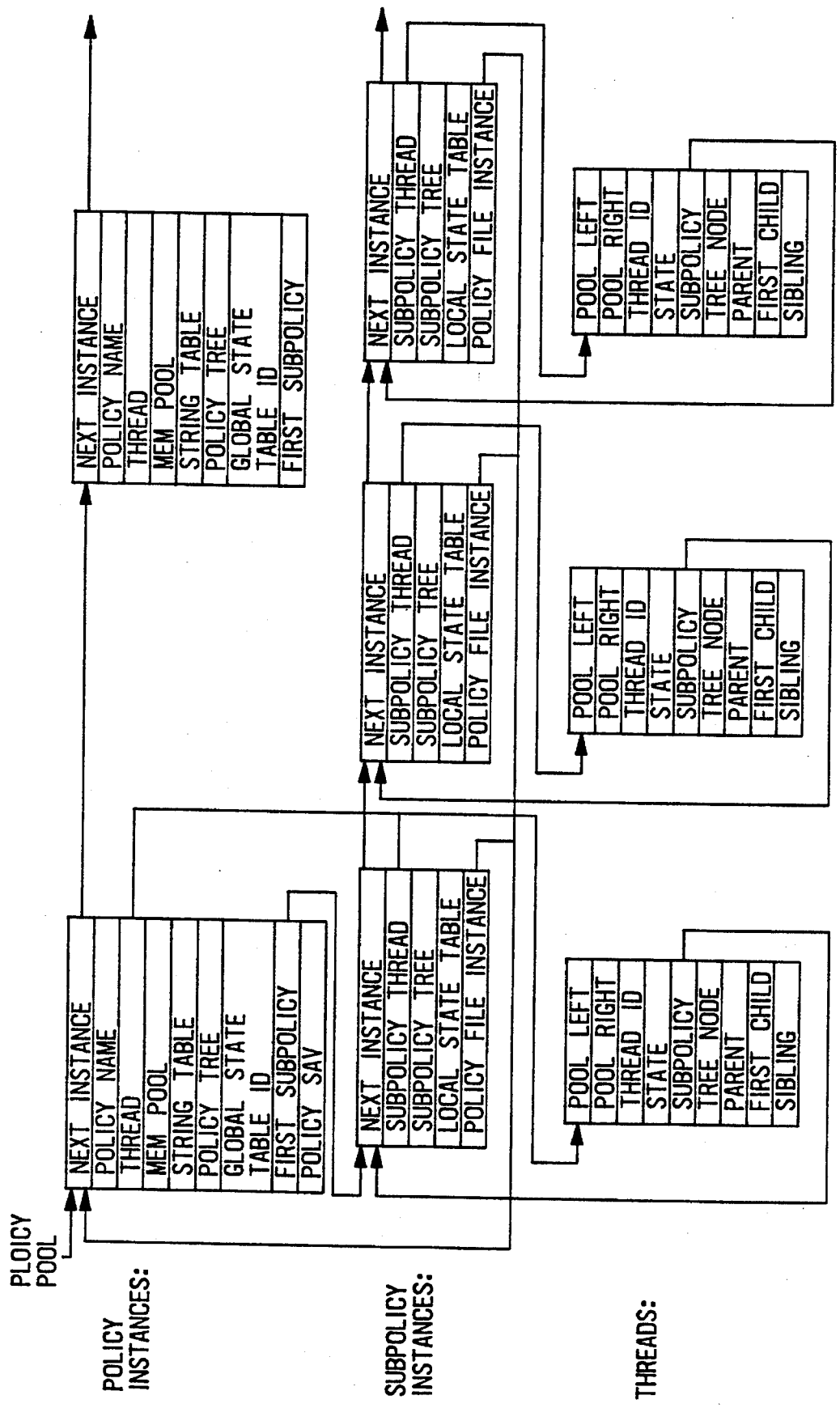
FIG. 6 is a data structure diagram useful in understanding how policies are loaded into the presently preferred policy interpreter.

FIG. 6 shows the main data structures of importance to the policy loader 43. The loader maintains one record for each action policy instance and one record for each active subpolicy instance. The policy instances are linked together with a singly linked list, as are all child subpolicy instances for each policy instance. Each policy instance has a pointer to its first child subpolicy instance and each subpolicy instance has a pointer to its parent policy instance.

Figure 7:
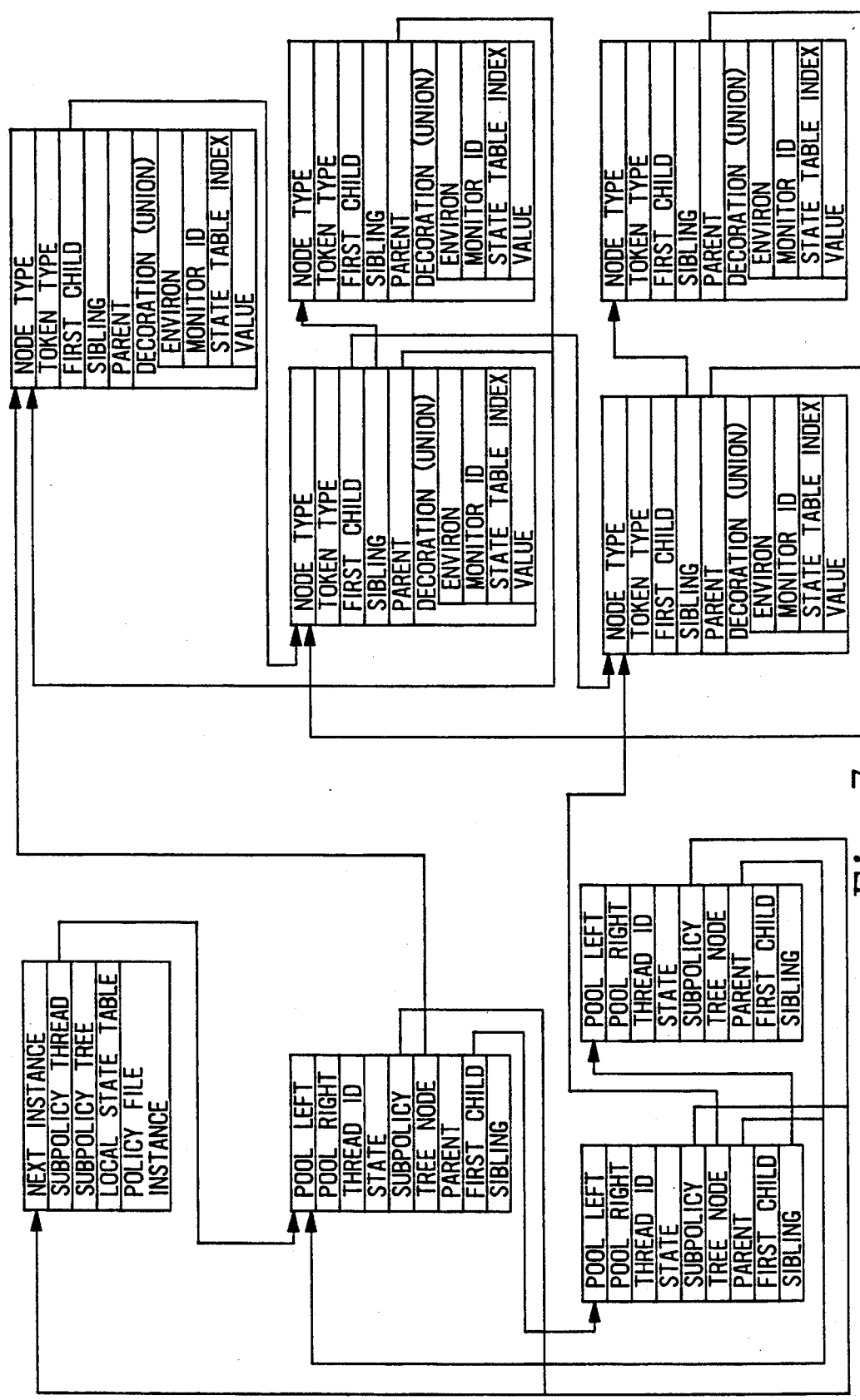
FIG. 7 is a data structure diagram useful in illustrating the manner in which the executor module operates.
Figure 8:
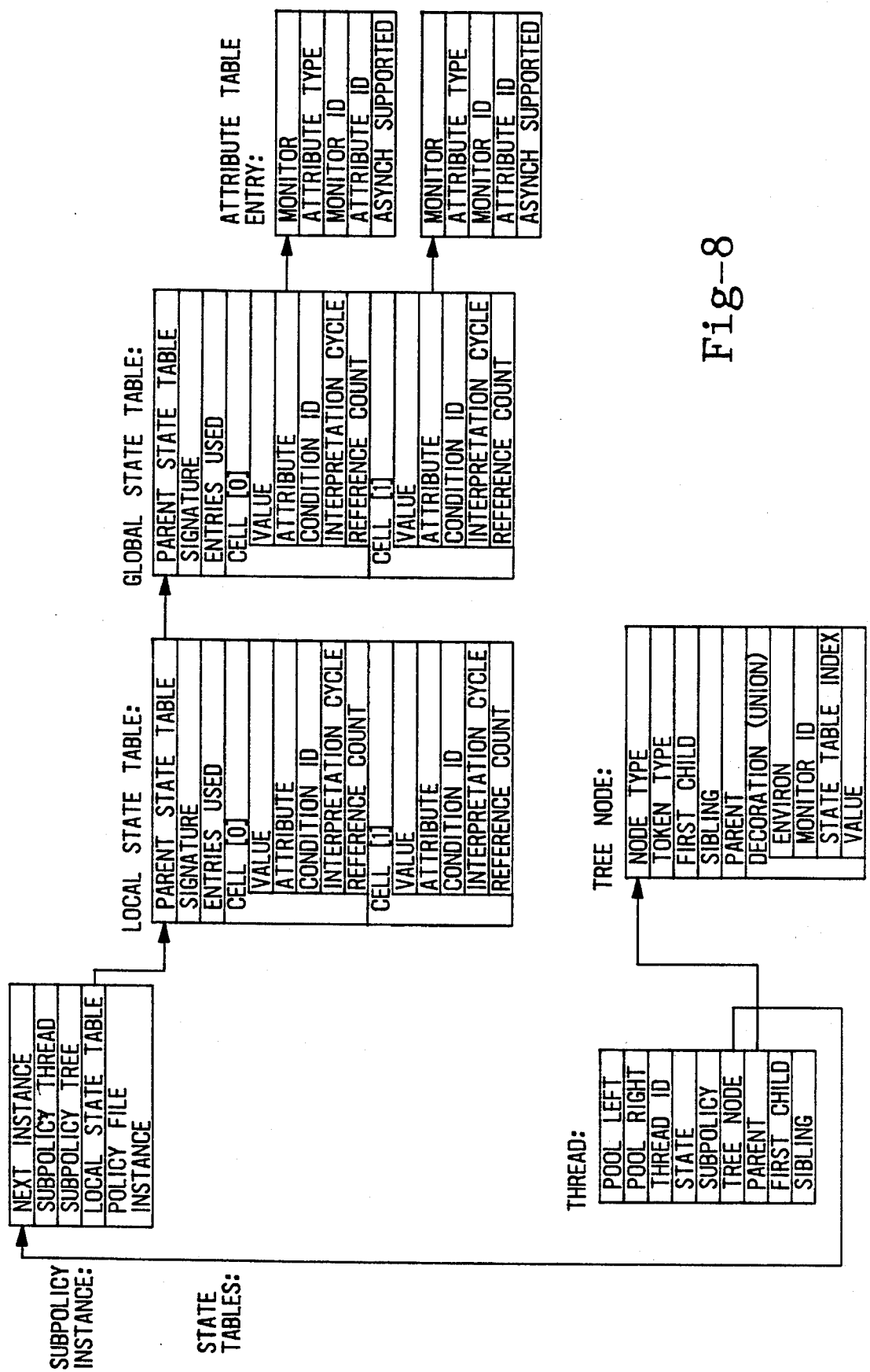
FIG. 8 is a data structure diagram useful in explaining how the expression evaluator of the presently preferred policy interpreter functions.

FIG. 7 shows the main data structures of importance to the executor The executor does not maintain any private data structures, but makes extensive use of the threads and of the Abstract Syntax Tree data structure. The executor's role is to traverse the Abstract Syntax Tree of each policy instance in order to interpret the policy, As it does this, it creates threads, moves them from pool to pool, and releases them as necessary. Although not illustrated in FIG. 7, executor 66 can have access to the policy file instance structure. Access to this structure is obtained through the subpolicy instance structure, as need for communicating with the policy loader and expression evaluator 67.

FIG. 8 shows the data structure of primary importance to the expression evaluator. Like the executor, the expression evaluator traverses the Abstract Syntax Tree, but it does so only for evaluating expressions. For evaluating identifiers, the expression evaluator maintains State Tables, one local State Table for each subpolicy instance and one global State Table for each policy file instance. There is a link from local to global State Tables, just as there was for the Environment Tables.

Monitor attributes are always stored in a global State Table. The State Table entry contains a pointer to the attribute's Attribute Table entry. This is also illustrated in FIG. 8. This entry is necessary for communication with the monitor whenever starting the monitoring of an attribute. Although not illustrated in FIG. 8, the expression evaluator maintains a directory of global State Tables. The primary reason for this directory is to accommodate the distributed nature of monitors and to handle the fact that attribute updates may arrive after the expression evaluator is no longer interested in them. The expression evaluator must have some way to recognize that such an update is stale and should not be made. To do this, the expression evaluator assigns an ID to global State Tables, preferably a combination of an index into the directory array and a signature word stored in the directory entry. If a monitor update arrives with a global State Table ID that is no longer in the directory, the expression evaluator knows to ignore it.

Figure 10A:
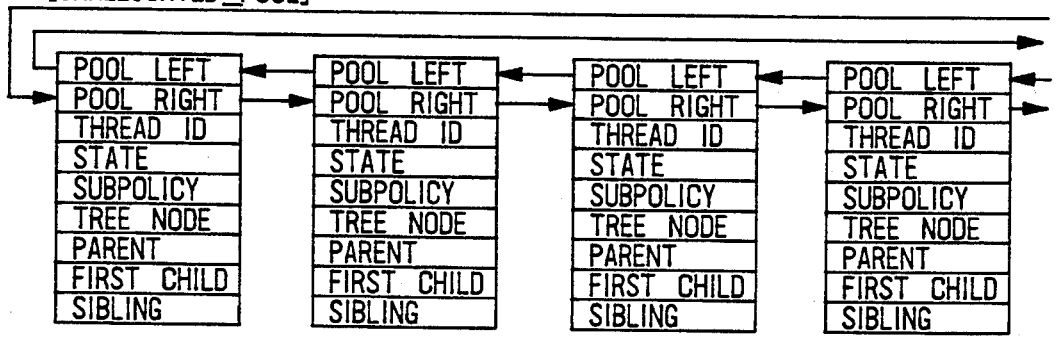
FIGS. 10a, 10b, and 10c are data structure diagrams further illustrating how the execution of threads are handled in the presently preferred embodiment.
Figure 10B:
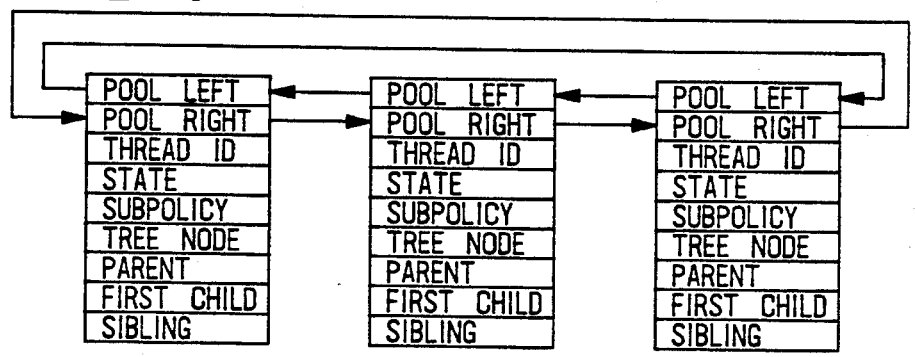
Figure 10C:
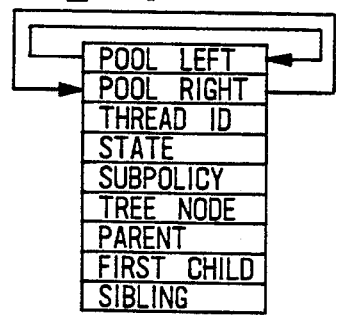

FIGS. 10a–10c shows the organization of threads into pools. This data structure is maintained by the executor module 66. More specifically, the executor module performs the thread management processes described in the pseudocode of the Appendix. The executor module 66 manages a pool of threads arranged as illustrated in FIG. 10a. FIG. 10a illustrates the manner in which the unallocated pool would appear. When a thread is introduced into the Ready Pool 68 it is placed as illustrated in FIG. 10b in a circularly referenced configuration employing a doubly-linked structure. The Zombie Pool, illustrated in FIG. 10c, is seen as a reduction of the Ready Pool structure to a single element in which both the left and right pointers are self-referencing.

In performing its functions as described by the pseudocode of the Appendix, executor module 66 will, from time to time, call upon expression evaluator 67. Expression evaluator 67 may be implemented as one or more routines for performing the necessary arithmetic and logical manipulation to determine whether certain conditions have been met. For example, the expression evaluator would be used to test the current time of day with the preprogrammed time of day in order to evaluate an expression such as "When time of day=12:00 noon . . . "

The Interpretation Cycle

The policy interpreter of the invention works by repeatedly executing an interpretation cycle. If there is nothing for the interpreter to do, it waits for an event to signal that the environment has changed, or that it should check the environment for certain changes, before executing the next cycle. In the presently preferred embodiment, the only time there can be any work to do is when a state variable changes or when an action completes. Changes in state variables and completed actions are marked by events. In some cases, the interpreter is responsible for watching for a change, but it is assumed that a separate timer module will notify the interpreter at regular intervals to poll the active polled attributes to see if they have changed. As previously explained, during one interpretation cycle, the policy interpreter sees a fixed snapshot of the policy state. This is done so that attribute values and local variables seen by the interpreter do not change while conditions are being evaluated. To accomplish this, each interpretation cycle goes through three stages:

1) updating the system state;

2) executing active threads; and 3) submitting actions and policies.

The flowchart of FIG. 9a illustrates the preferred interpretation cycle. As seen, the interpretation cycle executes a neverending loop which repeatedly executes the above-listed stages. In steps 100 and 102 the system state is updated and any completed actions and policies are processed. In this regard, there are three ways that variables may change during execution of a policy. First, system attributes or conditions may change as a result of changes in the network system parameters being monitored. Second, local variables may change as a result of receiving outputs from actions or policies as they complete. For example, a file name being returned as an output parameter from some action could cause a local variable to be changed. Third, local variables may change as a result of being assigned a thread ID when an action or policy is submitted. Importantly, in steps 100 and 102, each execution cycle starts by updating the state with any changes of the first and second types (changes due to monitored parameters and changes due to output parameters). Updates of the third type (changes due to action or policy submittal) are performed at the very end of the cycle in step 106. This occurs after policy evaluation (step 104). Thus the updated state is only available in the next execution cycle.

More specifically, step 100 updates the state associated with system attributes in one of two ways. For conditions being communicated asynchronously, the monitor interface is told to go ahead and make all updates that it has queued up since the last interpretation cycle. For polled attributes, the module responsible for handling polled events is told to go ahead and update the State Tables with the current value of each active polled attribute.

Step 102 is responsible for updating local variables with the result of return values. In this step the queue of actions and submitted policies that have completed since the beginning of the prior interpretation cycle are processed. The policy output arguments are processed, which updates the State Table, and their threads are placed on the Ready Queue.

Step 104 performs execution of active threads. Once the state has been updated, the interpretation of ready threads begins. During their lifetime, threads go through the states illustrated in FIG. 9b. More specifically, the interpreter maintains a pool of threads that are ready for execution. At each interpretation cycle, in step 104, the interpreter processes all the threads in the pool and continues until the pool is empty. The single thread being interpreted at any one time is said to be Active.

Threads in the Blocked state cannot be further interpreted until something else occurs. Threads can be Blocked waiting for completion of subthreads, a change in an attribute value, and so forth. A thread is in the Zombie state when it has been terminated by a WHILE guard or aborted, but cannot complete until its subthreads complete.

After Active threads are executed in step 104 the cycle continues at step 106 by updating the state to reflect the assignment of newly submitted thread IDs, thereby making those newly submitted threads available for the next interpretation cycle.

For a more complete understanding of the present interpretation cycle, refer to the pseudocode listing in Appendix B. In the pseudocode listing procedure calls and definitions are indicated by an initial capital letter and are following by parenthesis ( ) in closing arguments. The procedure body is enclosed in "Begin-end" procedure name pairs. Forevery and End_forevery is a loop indicator. If then else endif has the standard meaning and executes either of two statements depending on the condition. Switch index statements move control to the tag that matches the index in the list that follows the switch index. Tags are enclosed in quotes " ". Break is used to go to the end of switch statement after one tagged item has been executed, Return is used in some switch statements to break out of a loop or out of a switch statement and return from the enclosing procedure. Brackets { } are used to enclose indices.

In addition, the pseudocode distinguishes between "nodes" and "threads." Where the word "node" is used, it refers to an element in the tree structure representation of the executable policy. Where the word "thread" is used, it refers to an independent thread of execution that runs independently of other threads.

In order to appreciate some of the advantages the present system offers over conventional single-threaded languages consider how one would preprogram a system to archive old files after the disk becomes suitably full. Specifically, in this example, the archiving of old files should take place only after the disk is greater than 70% full and then only if the time is before 6:00 a.m.

Figure 11:
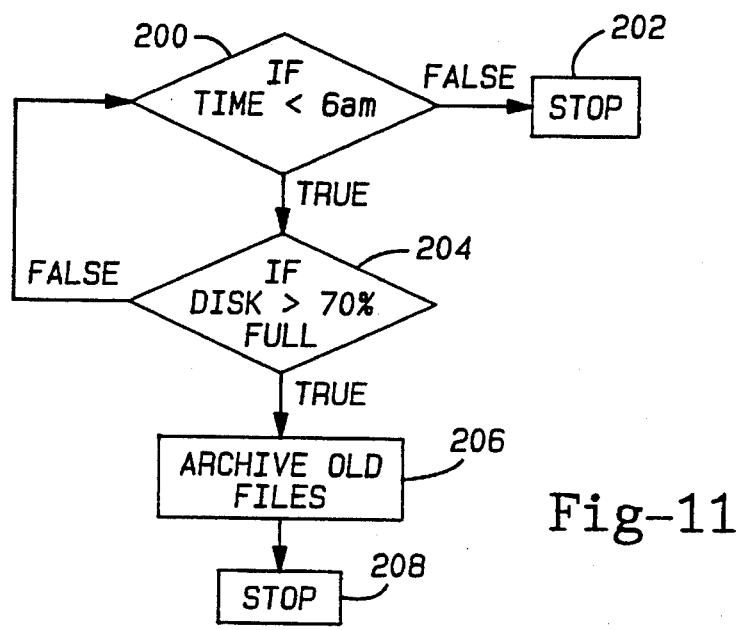
FIG. 11 is a flowchart illustrating a conventional single-threaded operation using conventional IF mechanism.

Referring to FIG. 11, a flowchart presenting the conventional single-threaded solution is illustrated. In step 200 a conventional IF statement tests whether the time is before 6:00 a.m. If the time is not before 6:00 a.m., the process stops at step 202. On the other hand, if the time is before 6:00 a.m., processing proceeds to step 204 where a second conventional IF statement tests whether the disk is more than 70% full. If the disk is not more than 70% full, the program branches back to step 200. On the other hand, if this second IF step 204 is true, control proceeds to step 206 where the procedure is implemented to archive old files. Thereafter, in step 208 the procedure stops.

In the conventional, single-threaded approach illustrated in FIG. 11, it is important to recognize that the process requires the central processor to operate continuously (cycling between steps 200 and 204) until the time is past 6:00 a.m. or until all of the archiving operations have completed at step 206. There is no way for the single-threaded conventional program to suspend archiving once it has begun at step 206, even if the time becomes later than 6:00 a.m. This is a significant shortcoming, since the archiving of old files can take a considerable length of time in order to move the data from disk to archival storage such as tape. Thus, using the conventional single-threaded system, users might be prevented from using the system for several hours (while archiving takes place) simply because the archiving procedure began one minute before 6:00 a.m.

Figure 12:
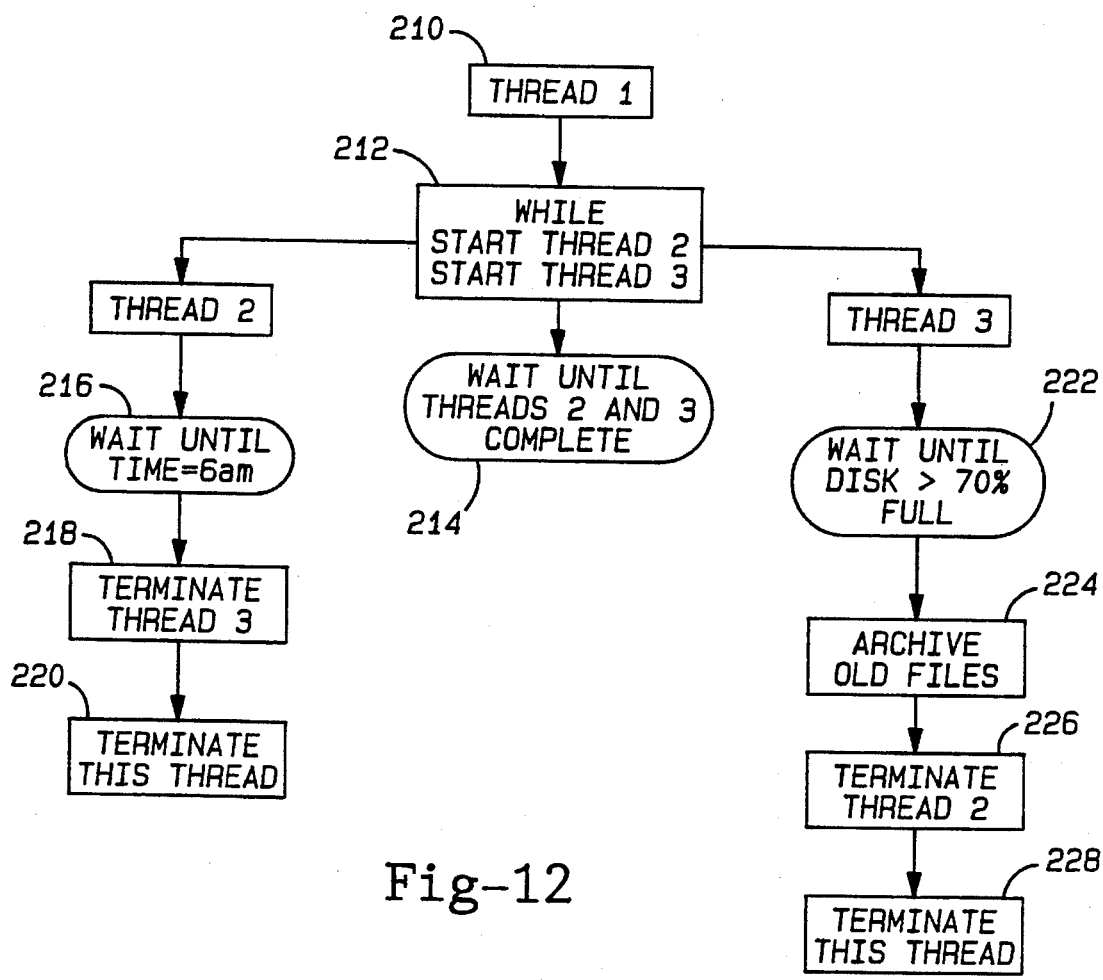
FIG. 12 is a flowchart illustrating a multithreaded operation made possible by the WHILE mechanism of the invention.

FIG. 12 illustrates the multithreaded WHILE construct of the present policy language. Beginning at step 210 with a single thread, Thread 1, control proceeds to the WHILE step 212. The WHILE step spawns two threads, Thread 2 and Thread 3. Both of these threads exist concurrently and are interactive with one another, as will be demonstrated.

After starting Thread 2 and Thread 3, program control for Thread 1 proceeds to step 214 where the thread waits until Threads 2 and 3 complete. Referring to the left-hand branch, Thread 2, control proceeds to step 216 where the Thread 2 process waits until the time is 6:00 a.m. The time is communicated to Thread 2 via the appropriate time monitor, using the data structures previously described. Once the time equals 6:00 a.m., the Thread 2 process continues to step 218 which causes Thread 3 to terminate. Thus Thread 2 is interactive with Thread 3. After terminating Thread 3, the Thread 2 process proceeds to step 220 where Thread 2, itself, is terminated.

Turning now to the right-hand branch (Thread 3), the Thread 3 process proceeds at step 222 to wait until the disk is more than 70% full. This condition is communicated to Thread 3 via the appropriate monitor and data structures previously described. Once the disk has become at least 70% full, the Thread 3 process proceeds to step 224 where the archiving of old files procedure is begun. Thereafter, the Thread 3 procedure continues on to step 226 where Thread 2 is terminated. Thus Threads 2 and 3 are bidirectionally interactive. After terminating Thread 2, the procedure continues at step 228 to terminate Thread 3, itself.

In contrast to the single-threaded approach, the multi-threaded, interactively-threaded approach, made possible by the WHILE mechanism, does not require the processor to run continuously. Rather, the WHILE mechanism permits the processor to wait or sleep at steps 214, 216 and 222 until being awakened by the appropriate event. This means that the processor is freed up to handle other processing tasks. In addition, the WHILE mechanism allows the system to break out of an archiving operation even if it is in progress when the time of day becomes 6:00 a.m. To see how this would occur, note that Thread 2 terminates Thread 3 at step 218. This occurs upon the time becoming 6:00 a.m. Once Thread 3 is terminated by step 218, the "archive old files" step 224 of Thread 3 is rendered inactive. In this fashion, the "archive old files" step 224 is made aware that the time of day has reached 6:00 a.m. and thus in a condition to be terminated, without the need to specially program the subpolicy "archive old files" step to periodically check the time of day condition. In contrast, the conventional single-threaded approach of FIG. 11 leaves the "archive old files" step 206 unaware of any change in the time of day condition. Thus, in order for the "archive old files" step 206 to break out of its routine upon the occurrence of 6:00 a.m., it would be necessary to rewrite the "archive old files" step to contain embedded timechecking algorithms. This would unduly complicate the network system and would not allow for the needed flexibility to allow the network operator or administrator to make changes in the programming of the system, From the foregoing it will be seen that the present invention provides a policy interpreter and the associated policy language which enable the network administrator or system operator to craft network control policies that free him or her from performing many of the day to day operations necessary for maintaining a computer network. While the invention has been described in its presently preferred form it will be understood that the principles of the invention may be extended or adapted to a variety of different configurations. Accordingly, the description provided herein is intended only to teach the principles of the invention and not to limit the scope of the invention as set forth in the appended claims.

APPENDIX A

A. Operators and Operator Precedence

The policy language includes a limited number of standard operators:

Boolean: and, or and not comparison: <, <=, >, >=, =, \= (not equal)

Arithmetic: +, −, *, /

String concatenation: ++

The precedence of operators is specified so as to minimize the need for required parentheses when writing expressions. The precedence hierarchy is:

| | |
|---|---|
| * / | Highest precedence |
| + − ++ | |
| < <= > >= = \= | |
| not | |
| and | |
| or | Lowest precedence |

B. Lexical Grammar

A lexical grammar describes the rules for recognizing the basic "words" or lexemes of the policy, and is the basis for specifying the interpreter scanner. Note on grammar notation: this lexical grammar, as well as the syntax grammar that follows, uses regular expressions in the right part of rules. This does not change the class of language describable by the grammar; it merely allows for a more compact formulation. The following are regular expression metasymbols:

| | |
|---|---|
| A \| B | either A or B |
| A* | zero or more occurrences of A |
| A+ | one or more occurrences of A |
| A? | zero or one occurrence of A, i.e. A is optional |
| ( ) | denotes groupings |

In addition, the lexical grammar assumes the following non-terminals have the indicated meaning:

| | |
|---|---|
| letter | 'A' ... 'Z', 'a' ... 'z' |
| digit | '0' ... '9' |
| tab | tab character |
| eol | end of line |
| any | any character in the ASCII character set |
| − | set subtraction, used in conjunction with 'any' |

End of note on grammar notation.

The following is the lexical grammar. Like most lexical grammars, it is ambiguous. All read/reduce ambiguities are resolved by reading. One and two digit numbers, not immediately followed by either a ':', 'am', 'pm', etc. are scanned as numbers. Thus, times must either specify the minutes or an am/pm designation to be recognized as times instead of numbers.

| | | |
|---|---|---|
| Lexical Grammer | * | (Identifier \| Integer \| Date \| Time \| String \| Operator \| Space \| Comment)+ |
| Identifier | * | letter (letter \| digit \| '_')* |
| Integer | * | '–'? digit+ |
| Date | * | digit digit? '/' digit digit? |
| Time | * | digit digit? ':' digit digit (('a' 'm') \| ('A' 'M') \| ('p' 'm') \| ('P' 'M'))? |
| String | * | '"' (any - '"' - eol) '"' |
| operator | * | '=' \| '\' '=' \| '<' \| '<' '=' \| '>' \| '>' '=' |
| | * | '+' \| '–' \| '*' \| '/' \| '++' |
| | * | '.' \| '(' \| ')' \| ';' \| ',' \| '<–' \| '{' \| '}' |
| Space | * | (' ' \| tab)+ eol? |
| Comment | * | '–' '–' (any – eol)* eol |

C. Screening

The screener, which sits between the scanner and the parser, performs the following in converting from lexemes to tokens;

| | |
|---|---|
| Identifier | Enters the string into the string table and creates an Identifier token. Note that case is not significant for any identifiers, including reserved words. |
| Integer | Enters the string into the string table and creates an Integer token. |
| Date | Enters the string into the string table and creates a Date token. |
| Time | Enters the string into the string table and creates a Time token. |
| String | Enters the string (without the enclosing quotes) into the string table and creates a String token. |
| Operator | Creates a unique token for each unique operator. |
| Space | Discards the lexeme. |
| Comment | Discards the lexeme. |

The screener recognizes the following identifiers as reserved and converts them into appropriate tokens:

| | | | | |
|---|---|---|---|---|
| policy | end_of_policy | when | while | do |
| first | either | and | then | or |
| not | independent | submit | abort | repeatedly |
| none | action | monitor | unknown | true |
| false | | | | |

D. Abstract Syntax

The abstract syntax of a language describes the underlying structure of the syntax, with inessential syntactic sugaring details removed. The abstract syntax of a particular language statement is a tree structure; it resembles a parse tree with inessential details removed. For example, a parse tree for the expression "a * (b+c)" with a typical expression grammar for expressions might be something like

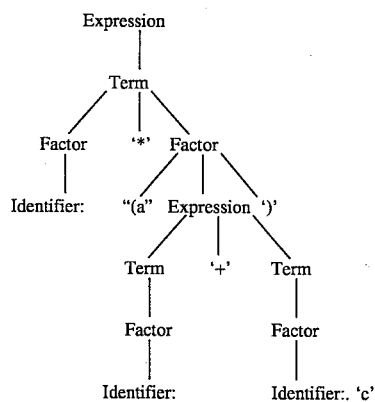

The abstract syntax tree for the same expression would simply be

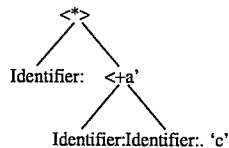

The abstract syntax of a language constitutes a convenient framework for describing the semantics of the language. Here we present the abstract syntax with a brief description of the associated semantics. Full discussion of the semantics for each tree node is contained in the semantics sections.

The following presentation of the abstract syntax can be viewed as a tree grammar, where terminal symbols (denoted by <>s) indicate tree nodes and the goal symbol is Policy_file.

Policy_file

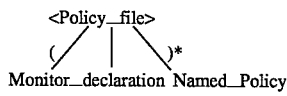

A policy file contains monitor declarations and named policies. The first policy in the file is taken to be the main policy. Other policies in the file are considered to be named subpolicies, and are executed only if invoked by the main policy.

Monitor_Declaration

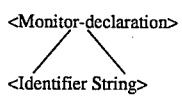

A monitor declaration selects a monitor using whatever global naming convention is appropriate for the environment and gives it a name that can be used in the policy where necessary.

Named_policy

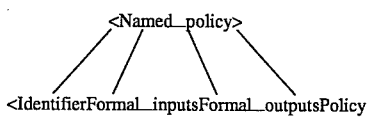

Each named policy has a name, formal input and output parameters and the policy itself.

Formal_inputs

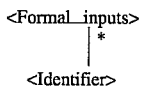

The formal parameter input list may be empty; this is indicated by "none" in the concrete syntax.

Formal_outputs

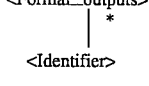

The formal parameter output list may be empty; this is indicated by "none" in the concrete syntax.

Policy

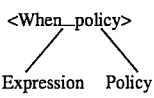

A When policy consists of a (Boolean) expression and a subpolicy. The expression guards entrance into the subpolicy.

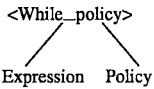

A While policy consists of a (Boolean) expression and a subpolicy. The expression acts as a daemon to terminate the subpolicy.

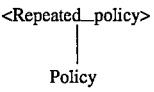

A Repeated policy consists of a subpolicy that is continually re-executed (until it is terminated by a containing While guard).

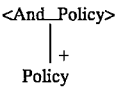

An And policy consists of two or more subpolicies. All of the subpolicies are activated in parallel.

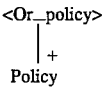

An Or policy consists of two or more subpolicies. Each subpolicy must be a When policy. As soon as the first When condition is TRUE, all other subpolicies are terminated, so that only one of the subpolicies is allowed to execute.

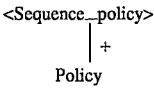

A Sequence policy consists of two or more subpolicies. The first subpolicy is activated first, the second subpolicy is activated when the first terminates, and so on.

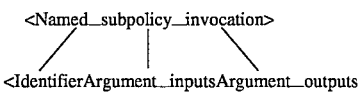

A named subpolicy invocation consists of the subpolicy name, along with input and output arguments.

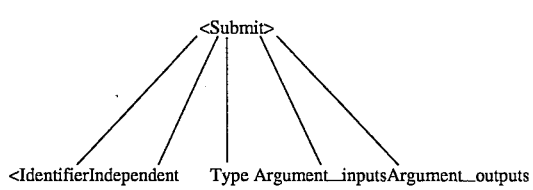

The Identifier, if present, is the name of the variable receiving the submit ID, not the name of the object being submitted. The name of the object being submitted is given as one of the input arguments.

Independent is either <TRUE> or <FALSE>. Type is either <Action> or <Policy>.

The ID of the object to be aborted is given as the identifier.

Expression

There are the three customary Boolean operators:

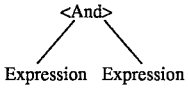

There are six comparison operators. Note that these operators are overloaded, i.e. they are defined for numbers, dates, times and strings:

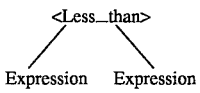

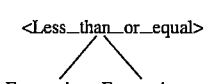

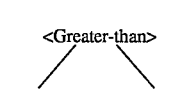

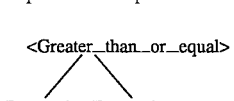

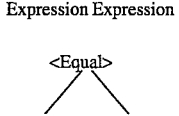

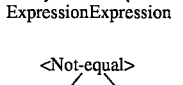

There are four arithmetic operators, defined for various types:

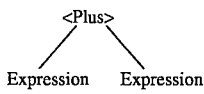

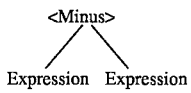

-continued

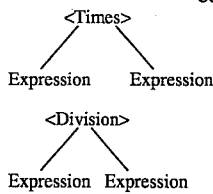

Concatenation, denoted by ++, is defined for strings:

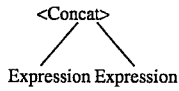

The terminal symbols in expressions are identifiers and constants of various types:

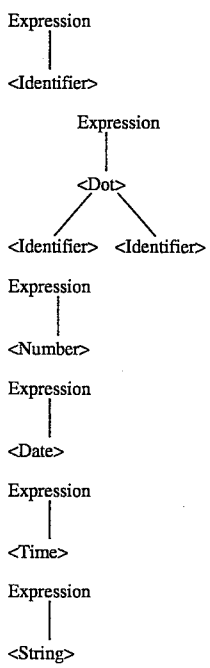

Argument_inputs

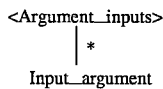

An argument input list consists of zero or more arguments.

Input_Argument

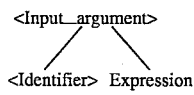

Input arguments are passed by specifying the callee's variable name and the parameter value. If a value is being passed from the from a caller's variable to a callee's variable of the same name, Expression can be omitted in the concrete syntax.

Argument_outputs

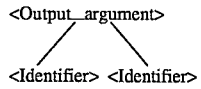

An argument output list consists of zero or more arguments.

Output_Argument

<Output_argument>
/        \
<Identifier> <Identifier>

Output arguments are passed by specifying the caller's and the callee's variable names. If both variables have the same name, the second identifier can be omitted in the concrete syntax, E. Concrete Syntax The following is the grammar for the concrete syntax of the policy language.

| Policy_file | * | (Monitor_declaration \| Named_policy)+ |
|---|---|---|
| Monitor_declaration | * | "Monitor" Identifier "=" String |
| Named_policy | * | "Policy" Identifier "(" Formal_inputs ";" Formal_outputs ")" Policy "End_of_Policy" |
| Formal_inputs | * | (Identifier list ',') \| "none" |
| Formal_outputs | * | (Identifier list ',') \| "none" |
| Policy | * | "When" Expression Policy |
|  | * | "While" Expression Policy |
|  | * | "Repeatedly" Policy |
|  | * | "{" "Do" Policy ("and" Policy)+ "}" |
|  | * | "{" "Either" Policy ("or" Policy)+ "}" |
|  | * | "{" "First" Policy ("then" Policy)+ "}" |
|  | * | Identifier "(" Argument_inputs ":" Argument_outputs ")" Submittal |
|  | * | Abort |
| Expression | * | Expression "or" Expression1 Expression 1 |
| Expression1 | * | Expression1 "and" Expression2 Expression2 |
| Expression2 | * | "not" Expression3 Expression3 |
| Expression3 | * | Expression4 "<" Expression4 |
|  | * | Expression4 "<=" Expression4 |
|  | * | Expression4 ">" Expression4 |
|  | * | Expression4 ">=" Expression4 |
|  | * | Expression4 "=" Expression4 |
|  | * | Expression4 "\=" Expression4 |
|  | * | Expression4 |
| Expression4 | * | Expression4 "+" Expression5 |
|  | * | Expression4 "-" Expression5 |
|  | * | Expression4 "++" Expression5 |
|  | * | Expression5 |
| Expression5 | * | Expression5 "*" Expression6 |
|  | * | Expression5 "/" Expression6 |
|  | * | Expression6 |
| Expression6 | * | QualifiedIdentifier \| Integer \| Date \| Time \| String |
|  | * | "(" Expression ")" |
| QualifiedIdentifier | * | (Identifier ".")? Identifier |
| Submittal | * | (Identifier "<-")? "submit" "independent"? ("policy" \| "action") "(" Argument_inputs (";" Argument_outputs)? ")" |
| Abort | * | "abort" "(" Identifier ")" |
| Argument_inputs | * | (Input_argument ("," input_argument)*)? |

| | |
|---|---|
| Input_argument | * Identifier ("=" Expression)? |
| Argument_Outputs | * (Output_argument ("," Output_Argument)*)?" |
| Output_argument | * Identifier ("=" Identifier)? |

F. Static Semantics

Static semantics consists of semantic checks that are made without executing the policy. In the policy language, these checks mostly consist of verifying that identifiers have been declared and that expressions have plausible types.

The static semantics is defined in terms of the abstract syntax, as follows.
Policy_file

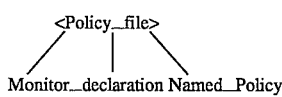

There must be at least one named policy.
Monitor_Declaration

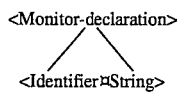

Each monitor name is checked to verify that the name does not already exist in the global scope. If not, it is entered into the global scope. Each attribute and enumerated type value provided by a monitor is checked to verify that if that name is already in the global scope, it is declared as an attribute or enumerated type value. If there are no conflicts, each attribute and enumerated type value is entered into the global environment.
Named_policy

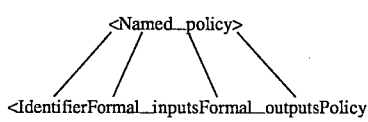

The policy name is checked to verify that the name does not already exist in the global scope. If not, it is entered into the global scope.
Formal_inputs

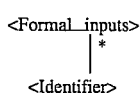

Each identifier is entered into the local name scope.
Formal_outputs

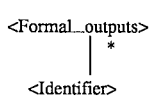

Each identifier is verified to be in the local name scope.

Policy

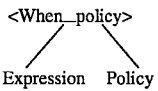

The type of Expression must be Boolean.

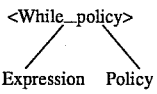

The type of Expression must be Boolean.

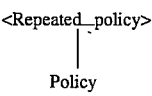

No static semantics.

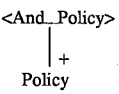

No static semantics.

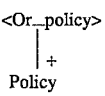

Each subpolicy must be a <when> policy.

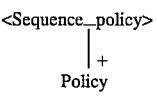

No static semantics.

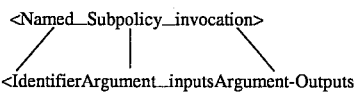

The identifier must be declared in the global scope as a policy.

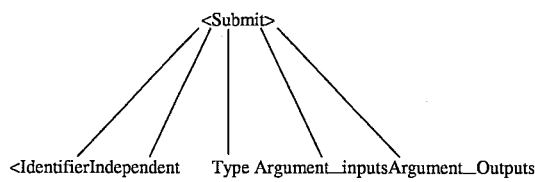

The identifier, if present, is entered into the local scope as a submittal ID.

The identifier must be declared as a submittal ID.

Expression

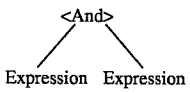

Each Expression must be of type Boolean. The type of the <And> node is Boolean.

Each Expression must be of type Boolean. The type of the <Or> node is Boolean.

The Expression must be of type Boolean. The type of the <Not> node is Boolean.

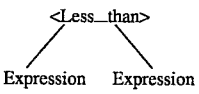

Either both Expressions must be of the same type—integer, date or time—or one of the Expressions must be of type string and the other of type integer, date, time or string. The type of the <Less_than> node is Boolean.

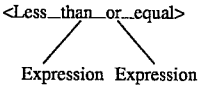

Either both Expressions must be of the same type—integer, date or time—or one of the Expressions must be of type string and the other of type integer, date, time or string. The type of the <Less_than or equal> node is Boolean.

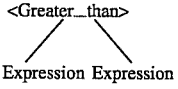

Either both Expressions must be of the same type—integer, date or time—or one of the Expressions must be of type string and the other of type integer, date, time or string. The type of the <Greater_than> node is Boolean.

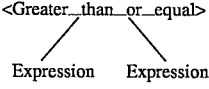

Either both Expressions must be of the same type—integer, date or time—or one of the Expressions must be of type string and the other of type integer, date, time or string. The type of the <Greater_than or equal> node is Boolean.

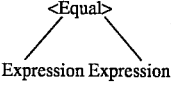

Either both Expressions must be of the same type integer, date, time or Boolean—or one of the Expressions must be of type string. The type of the <Equal> node is Boolean.

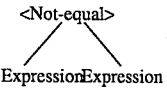

Either both Expressions must be of the same type—integer, date, time or Boolean—or one of the Expressions must be of type string. The type of the <Not_equal> node is Boolean.

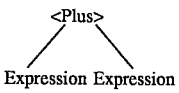

No static semantics. Note that this does allow some questionable expressions, such as adding a date and a time. The type of the <Plus> node is Integer.

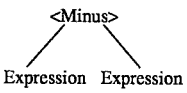

No static semantics. Note that this does allow some questionable expressions, such as subtracting a date from a time. The type of the <Minus> node is Integer.

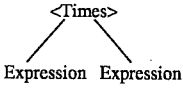

No static semantics. Note that this does allow some questionable expressions, such as multiplying a date by a time. The type of the <Times> node is Integer.

No static semantics. Note that this does allow some questionable expressions, such as dividing a date by a time. The type of the <Division> node is Integer.

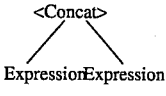

No static semantics. The type of the expression is String.
<Identifier>

The Identifier must exist in either the global or local scope and must be of type Integer, Date, Time, Enumerated or String. If the type of Identifier is Enumerated, the type of the <identifier> node is String. Otherwise, the type of the <identifier> node is the same as the type of the Identifier.

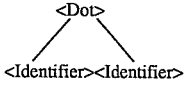

The first identifier must be declared as a monitor and the second identifier must be an attribute supplied by that monitor. If the type of the attribute is Enumerated, the type of the <Dot> node is String. Otherwise, the type of the <Dot> node is the same as the type of the attribute.

<Integer>

The type is of the <Integer> node is Integer.

<Date>

The type of the <Date> node is Date.

<Time>

The type of the <Time> node is Time.

<String>

The type of the <String> node is String.
Argument_inputs

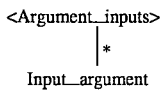

There are no static semantic checks.
Input_Argument

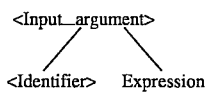

If this is an argument to a named subpolicy invocation, the Identifier must be declared as a formal input in the callee's local scope.
Argument_outputs

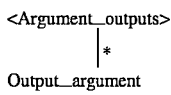

There are no relevant static semantic checks.
Output_Argument

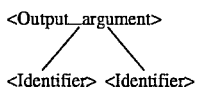

The first identifier is entered into the (caller's) local scope, if it is not there already. If this is an argument to a named subpolicy invocation, the second identifier (or the first, if the second is not present) is verified to be declared in the callee's local scope.

G. Dynamic Semantics

Dynamic semantics specifies the interpretation of the policy as it is executing. Like the static semantics, it can best be defined with reference to the abstract syntax.
Policy_file

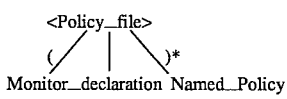

When the policy file is submitted, a global state table is instantiated. The first named policy is selected and any parameters to the policy are loaded into the local environment of the subpolicy. This subpolicy is then activated.
Monitor_Declaration

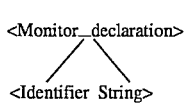

No dynamic semantics.

Named_policy

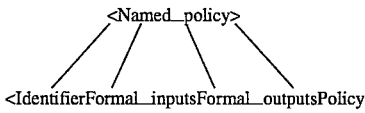

When a named policy is activated, the local environment has already been created by the caller. All that is necessary is to activate the policy body.
Formal_inputs

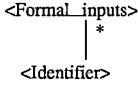

No dynamic semantics; identifiers are added into the environment as they get values defined.
Formal_outputs

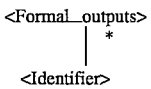

No dynamic semantics; identifiers are added into the environment as they get values defined.
Policy

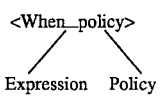

When activated, the Expression is continually evaluated. When it evaluates to TRUE, the subpolicy is activated. When the subpolicy completes, the When policy completes.

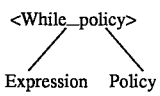

When activated, the Expression is evaluated. If it evaluates to FALSE, the While policy immediately completes. Otherwise, the subpolicy is activated. While the subpolicy is active, the Expression is continually evaluated; if it ever evaluates to FALSE, the subpolicy is terminated. When the subpolicy completes, the When policy completes.

<Repeated_policy>
|
Policy

When activated, the subpolicy is immediately activated. If the subpolicy completes on its own, it is re-activated. The Repeated policy completes only if it is terminated from above by a While guard.

<And_Policy>
| +
Policy

When activated, a new thread is created and activated for each subpolicy. As subpolicies complete, their threads are destroyed. When all the subpolicies complete, the And policy completes.

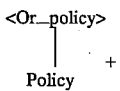

When activated, each of the subpolicies (which must be When policies) is activated. As soon as one of the When conditions evaluates to TRUE, the other subpolicies are terminated. When the remaining policy completes, the Or policy completes.

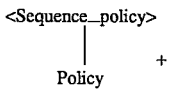

When activated, the first subpolicy is activated. When it completes, the second subpolicy is activated, and so on. When the last subpolicy completes, the Sequence policy completes.

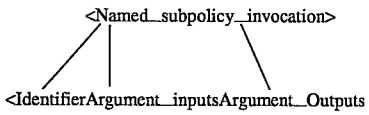

When activated, a new local environment is created. This environment is passed to Argument_inputs for initialization. The policy associated with Identifier is then activated in the new local environment.

When the named subpolicy completes, the new local environment is passed to Output_arguments for the purpose of updating the caller's environment. The new local environment is then destroyed and the caller completes.

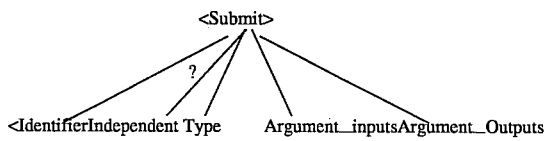

When activated, a new local environment and new execution thread are created. The thread ID is assigned to Identifier, if it has been specified. The environment is passed to Argument_inputs for initialization.

The value of Type indicates the type of object is being submitted.

If it is <Action>, the new environment is converted to a form containing only ASCII strings and the action interface is invoked with this environment.

If it is <Policy>, a new global environment is created, the policy file bound to <Identifier> in the universal environment is opened and loaded into the new global environment. The first policy in the policy file is invoked in the new local environment.

If Independent is <TRUE>, both old and new threads are made active; otherwise only the new thread is made active and the old waits for completion of the new.

When the new thread completes, the new environment is passed to Output_arguments for the purpose of updating the caller's environment. The new local environment is then destroyed and the caller completes.

The value of Identifier is retrieved and the thread with this thread ID is aborted.
Expression

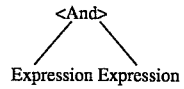

If the value of both expressions is TRUE, the value of the And expression is TRUE. If the value of either expression is FALSE, the value of the And expression is FALSE. Otherwise, the value of the And expression is UNKNOWN.

If the value of either expression is TRUE, the value of the Or expression is TRUE. If the value of both expressions is FALSE, the value of the or expression is FALSE. Otherwise, the value of the Or expression is UNKNOWN.

If the value of the subexpression is FALSE, the value of the Not expression is TRUE. If the value of the subexpressions is TRUE, the value of the Not expression is FALSE. Otherwise, the value of the Not expression is UNKNOWN.

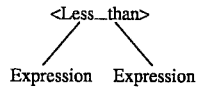

Both subexpressions are converted to integers if necessary. If either converted value is UNKNOWN, the value of the Less_than expression is UNKNOWN. Otherwise, the value of the Less_than expression is the value of the integer comparison.

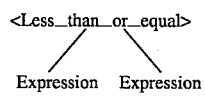

Both subexpressions are converted to integers if necessary. If either converted value is UNKNOWN, the value of the Less_than_or_equal expression is UNKNOWN. Otherwise, the value of The_Less_than_or_equal expression is the value of the integer comparison.

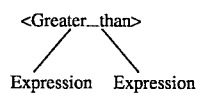

Both subexpressions are converted to integers if necessary. If either converted value is UNKNOWN, the value of the Greater_than expression is UNKNOWN. Otherwise, the value of the Greater_than expression is the value of the integer comparison.

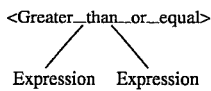

Both subexpressions are converted to integers if necessary. If either converted value is UNKNOWN, the value of the Greater_than_or_equal expression is UNKNOWN. Otherwise, the value of the Greater_than_or_equal expression is the value of the integer comparison.

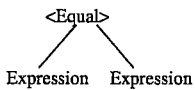

If both subexpressions are strings, a case-insensitive comparison is made between the two strings. If either value is UNKNOWN, the value of the Equal expression is UNKNOWN. Otherwise, both subexpressions are converted to integers if necessary. If either converted value is UNKNOWN, the value of the Equal expression is UNKNOWN. Otherwise, the value of the Equal expression is the value of the integer comparison.

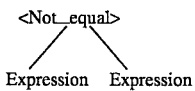

If both subexpressions are strings, a case-insensitive comparison is made between the two strings. If either value is UNKNOWN, the value of the Not_equal expression is UNKNOWN. Otherwise, both subexpressions are converted to integers if necessary. If either converted value is UNKNOWN, the value of the Not_equal expression is UNKNOWN. Otherwise, the value of the Equal expression is the value of the integer comparison.

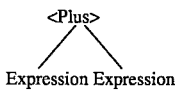

Both subexpressions are converted to integers if necessary. If either converted value is UNKNOWN, the value of the Plus expression is UNKNOWN. Otherwise, the value of the Plus expression is the value of the integer addition.

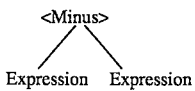

Both subexpressions are converted to integers if necessary. If either converted value is UNKNOWN, the value of the Minus expression is UNKNOWN. Otherwise, the value of the Minus expression is the value of the integer subtraction.

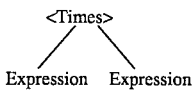

Both subexpressions are converted to integers if necessary. If either converted value is UNKNOWN, the value of the Times expression is UNKNOWN. Otherwise, the value of the Times expression is the value of the integer multiplication.

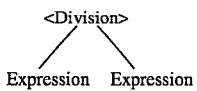

Both subexpressions are converted to integers if necessary. If either converted value is UNKNOWN, the value of the Division expression is UNKNOWN. Otherwise, the value of the Division expression is the value of the integer division.

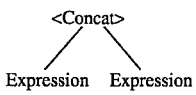

Each subexpression is converted to a string if necessary. TRUE, FALSE and UNKNOWN values are converted to "TRUE", "FALSE" and "UNKNOWN". The value of the Concat node is the concatenation of the converted subexpressions,

The value (including type) of the Identifier is retrieved from the local environment if it is there; otherwise it is retrieved from the global environment.

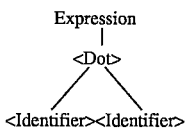

The value (including type) of the pair of Identifiers is retrieved from the global environment.

The value (including type) is retrieved from the global environment.

The value (including type) is retrieved from the global environment.

The value (including type) is retrieved from the global environment.

The value (including type) is retrieved from the global environment. Argument_inputs

```
<Argument_inputs>
       |
       *
  Input-argument
```

No dynamic semantics.
Input_Argument

```
    <Input_argument>
       /        \
  <IdentifierExpression
```

The value of Expression (or of Identifier, if Expression is null) is determined and converted into a string if necessary. The Identifier and value are then placed in the newly constructed callee's local environment.
Argument_outputs

```
<Argument_ouputs>
       |
       *
  Output-argument
```

No dynamic semantics,
Output_Argument

```
   <Output_argument>
       /        \
  <Identifier><Identifier>
```

The right Identifier (or left, if the right is null) is evaluated in the callee's environment. This value is given to the left Identifier in the caller's local environment.

H. Sample Policy

The following is an example of a policy written in the MicroWave policy language. Although it is a fairly simple policy, it is intended to be a realistic example that demonstrates many of the features of the language.

The following are monitor declarations. The effect of a monitor declaration is to make all the attributes and enumerated values maintained by that monitor accessible to the policy.

The first name is the name that can be used in the policy to disambiguate attribute names where necessary, e.g. Vol1.PercentCapacityUsed.

The second name, enclosed in quotes, is the external, or universal, name of the monitor, using whatever naming convention is used in the environment the policy is being interpreted in.

Monitor                                    DateTime=
    "Emerald@SanDiego@DateTimeMonitod"
Monitor                                    Vol1=
    "Emerald@SanDiego@FileService1Monitor"
Monitor                                    Vol2=
    "Emerald@SanDiego@FileService2Monitor"
Policy corporate_policy (none; none)

There are two components to the main policy. They are done in parallel.

```
{ Do
        Nightly_Backups( )
   and
        Disk_load_balancing( )
}
```

End_of_policy

The nightly backup policy consists of successively backing up three data sets. (There are three data sets simply because there is too much data for one tape and backups are done at night when there is no one available to change the tape.

```
Policy Nightly_Backups (none; none)
Repeatedly
{ First
            Backup_data_set (Data_set = "Set_A")
      then
            Backup_data_Set (Data_set = "Set_B")
      then
            Backup_data_set (Data_set "Set_C")
End_of_policy
```

The backup of a data sets starts at 1:00 am each morning except Monday. (Monday morning is skipped because no one is available to change the tape on Sunday.)

If the backup does not succeed for any reason, the same data set is tried again the next morning, and so on until it does succeed.

If for some reason the backup is not complete by 8:00 am, it is aborted and restarted the next morning.

A value returned from submit is used to identify the action to be aborted. Note that abort may be invoked even though the backup action is complete. Specifically, this will happen if the backup program completes, but returns a non-zero STATUS value. In addition, abort might well be invoked multiple times during the one minute that it is 8:00 am. Neither of these causes ill effects because the set of values returned by submit is large enough that the same value will not be reassigned to a second action.

Notice that the Backup_data_set policy makes the time at which the backup successfully completes available to its caller. Here, the calling policy ignores this parameter simply by not referring to it.

```
Policy Backup_data_set (Data_set; Time)
While Backup_status \= 0
Repeatedly
{ Do
     When Time = 1:00am and Day_of_week = Monday
        Action_ID <- submit action (Name = "MSSAVE",
            Arguments = "/R" ++ Data_set ++ ".RSP",
            Working_directory = "C:\MW"
            ;
            Backup_status = STATUS
            )
and
     When Time 8:00 am
          abort (Action-ID)
}
End_of_policy
```

The Disk_load_balancing policy consists of checking the free space on each of two volumes at 11:00 PM. If either one has less than 50 MB of free space and the other's free space is at least 100 MB greater, an attempt is made to even out the loads by migrating the \WP directory tree.

```
Policy Disk_load_balancing (none; none)
Repeatedly
{ Either
      When Time = 11:00pm
         and Vol1.KFree < 50000
```

```
            and Vol2.KFree_Vol1.KFree > 100000
                submit action (Name "MIGRATE",
                    Arguments = "/S Vol1/D Vol2/T \WP"
                )
    or
        When Time = 11:00pm
            and Vol2.KFree < 50000
            and Vol2.KFree_Vol2.KFree > 100000
                submit action (Name "MIGRATE",
                    Arguments = "/S Vol2/D Vol1/DIR WP"
}
End-of_policy
```

APPENDIX B

Policy Interpreter

The Policy Interpreter carries out the functions described in the Policies by traversing a compactly encoded tree structured representation of the Policy. This is the executable form of the language. The Policy source language is translated into this executable form using conventional compiler algorithms for parsing and scanning syntax and performing syntax and semantic error detection.

In describing the interpreter algorithm, it is assumed that the interpreter provides a multi threaded environment. In fact the actual interpreter implements this kind of an environment, which is typical of the kernel of most operating systems, in particular real time kernels such as Thoth (1). For clarity these implementation details are not given in the description of the algorithm, since they are well documented elsewhere.

The policy interpreter works by repeatedly executing an interpretation cycle. If there is nothing for the interpreter to do, it waits for an event to signal that the environment has changed or that it should check the environment for certain changes, before executing the next cycle. The only time there can be any work to do is when a state variable changes or an action completes. Changes in state variables and completed actions are marked by events. In some cases the interpreter is responsible for watching for a change but it is assumed that a separate module will poll for those changes at some regular time interval and notify the interpreter through an event.

During one interpretation cycle, the policy interpreter sees a fixed snapshot of the policy state, so that attribute values and local variables seen by the interpreter do not change while conditions are being evaluated. This guarantees, for example, that a When condition is idempotent, i.e. that

```
                When A
                    X
            and
                When A
                    When A
                        X
``` have the same semantics.

To accomplish this, each interpretation cycle goes through three stages:
  Updating the system state,
  Executing active threads, and
  Submitting actions and policies.
Interpreter algorithm

```
            ExecuteInterpretationCycle( )
            Begin
                ProcessCompletedActionsPolicies( )
                UpdateState( )
                ExecuteReadyThreads( )
                SubmitActionsPolicies( )
            End ExecuteInterpretationCycle
```

There are three ways that variables may change during execution of a policy:
  System attributes or conditions that change as a result of changes in the network system parameters being monitored,
  Local variables that get outputs from a completing action or policy (e.g. a file name being returned as an output parameter from some action),
  Local variables that get assigned a thread ID when an action or policy is submitted.

Each execution cycle starts by updating the state with any changes of the first two types. Updates of the last type are performed at the very end of the cycle, after policy evaluation. This updated state is only available in the next execution cycle.

The state associated with system attributes is updated by the routine UpdateStateO. For attributes being communicated asynchronously, the monitor interface module is told to go ahead and make all updates that it has queued up since the last interpretation cycle.

For polled attributes, the appropriate monitor is polled when the attribute value is needed. The number of the current interpretation cycle is stored with the attribute in the attribute table, so that a subsequent use of the same attribute in the same interpretation cycle will not cause the monitor to be polled again. Since the implementation of this is straight forward and obvious, it is not included here.

To update local variables with the result of return values, the queue of actions and submitted policies that have completed since the beginning of the prior interpretation cycle are processed in ProcessCompletedActionsPolicies0. The policy output arguments are processed, which updates the submitter's state table, and their threads are then complete.

The updating of the state to reflect the assignment of newly submitted thread IDs occurs at the very end, instead of the beginning, of the interpretation cycle. This is performed in the routine SubmitActionsPolicies0. Thus, this updated state is not available until the next interpretation cycle.

Execute Active Threads

Once the state has been updated, the interpretation of ready threads begins. During their lifetime, threads go through the following states:

The interpreter maintains a pool of threads that are ready for execution. At each interpretation cycle, it processes all the threads in the pool, continuing until the pool is empty. The single thread being interpreted at any one time is said to be Active.

Threads in the Blocked state cannot be further interpreted until something else occurs. Threads can be blocked waiting for completion of sub-threads, a change in an attribute value, etc.

A thread is in the Zombie state when it has been terminated by a While guard or been aborted, but cannot complete until its sub-threads complete.

The algorithms for implementing the policy engine are expressed in the following pseudo code. The constructs used include:
  Procedure calls and definitions are indicated by an initial capital letter and are followed by parenthesis ( ) enclosing arguments.

Procedure bodies are enclosed in Begin . . . end procedure name pairs. Forevery . . . end_forevery is a loop indicator with the obvious meaning.

While condition . . . end_while is a loop. At the start of each iteration of the loop, the condition is tested and the loop terminates if the condition is false.

Repeat forever . . . end_repeat is a loop indicator that repeats until the execution of a return statement causes the enclosing procedure to terminate.

If . . . then . . . else . . . end_if has the standard meaning and executes either of two statements depending on the condition.

Switch index . . . end_switch statement moves control to the tag that matches the index in the list that follows the Switch index. When the statements associated with that tag have been executed, control passes to the statement following the end_switch, not the first statement associated with the next tag. Tags are enclosed in quotes" ".

return is used in places to break out of a loop and return from the enclosing procedure.

[ ] Brackets are used for indices

All other statements are written in English.

In addition, it is important to distinguish between "nodes" and "threads". Where the word node is used it refers to an element in the tree structured representation of the executable policy. A thread refers to an independent thread of execution that runs independently of other threads.

All other statements are written in English.

In addition, it is important to distinguish between "nodes" and "threads". Where the word node is used it refers to an element in the tree structured representation of the executable policy. A thread refers to an independent thread of execution that runs independently of other threads.

ExecuteReadyThreads()

Begin

Forevery thread on the current ready queue get current_thread from top of current ready queue set current_thread state to Active

While thread state is Active

Switch node_type[current_node]

"When_node":

StartMonitoringCondition(current_thread)

move current_node to when condition node, where execution will continue

"When_condition_node"

If When condition is true then

StopMonitoringCondition(current_thread)

If parent of When_node is Or_list then

Terminate_Siblings(current_thread)

end_if move current_node to When policy body node, where execution will continue else set current_thread state to ready and put on <u>next</u> ready queue, to be re-examined next cycle end_if

"While_node":

StartMonitoringCondition(current_thread)

If While condition is not false then /* since condition can be undefined we test explicitly for not false rather than true */ create child thread for while condition, set its state to ready and put on <u>next</u> ready queue, to be re-examined next cycle create child thread for while policy body, set its state to ready and put on <u>current</u> ready queue set current_thread state to blocked and put on blocked queue else

StopMonitoringCondition(current_thread)

PolicyBodyIsComplete(current_thread)

end_if

"While_condition_node":

If condition is false then

StopMonitoringCondition(current_thread)

Terminate(while policy body thread)

ThreadIsComplete(current_thread)

else set current_thread state to ready and put on <u>next</u> ready queue, to be re-examined next cycle end_if

"Repeatedly_node":

move current_node to Repeat policy body node

/*current state stays Active so this will continue to execute */

"And_node":

"Or_node":

Forevery child node of the current node create thread for child node set thread state to ready and put thread on <u>current</u> ready queue end_forevery set current_thread state to blocked and put on blocked queue

"Sequence_node":

move current_node to first subtree

/*current state stays Active so this will continue to execute */

"Named_subpolicy_node":

create a new thread for the new policy initialize the new policy /*the values of any input parameters are
entered into the new subpolicy's local state table */ set the new thread state to ready and put on current ready queue set current_thread state to blocked and put on blocked queue "Submit_node":

create a new thread for the submittal and put on the queue to be submitted by

SubmitActionsPolicies()

set current_thread state to blocked and put on blocked queue /*even independent submittals cause the submitter to be blocked until the state is updated with the thread ID in SubmitActionsPolicies() */

"Abort_node":

Abort_thread(identified_thread)

PolicyBodyIsComplete(current_thread)

end_switch end_while end_forevery end ExecuteReadyThreads

PolicyBodyIsComplete(current_thread)

Begin

Repeat forever /*escape by returning from within the switch */

/* The policy body associated with the current node is complete;

the parent of the current node dictates what to do next */

Switch Node_type[parent node]

"When_node":

move current_node to parent node

/*will continue processing parent */

"While_node":

StopMonitoringCondition(while condition thread)

ThreadIsComplete(while condition thread)

ThreadIsComplete(current_thread)

return

"Repeatedly":

/*simply re-execute the policy body */ set current_thread state to ready and put in <u>current</u> ready queue return

"Sequence_node":

If there is a next sibling then move current_node to next sibling set current_thread state to ready and put in current ready queue return else move current_node to parent node /*continue processing parent */ end_if

"And_node":

"Or_node":

"Named_subpolicy_node"

ThreadIsComplete(current_thread)

return end_switch end_repeat end PolicyBodyIsComplete

ThreadIsComplete(thread)

Begin get the thread's parent, if it has one remove the thread from its queue clean up all thread resources return thread to available queue If the thread had no parent, or the parent still has children then

> return end_if

If the state of the parent thread is blocked then

> PolicyBodyIsComplete(parent thread)

else /*the parent thread was in the zombie state */

> ThreadIsComplete(parent thread)

end_if end ThreadIsComplete

Terminate_Siblings(thread)

Begin

> Forevery Sibling_thread[thread]]
>
> > if Sibling_thread[thread] is not thread then
> >
> > > Terminate(Sibling_thread[thread])
> >
> > end_if
>
> end_forevery end Terminate_Siblings Terminate(thread)

Begin

> If thread is waiting on a condition then

StopMonitoringCondition(thread)

end_if

If thread has children then set thread state to zombie and put on zombie queue

Forevery child_thread[thread]

Terminate(child_thread[thread])

end_forevery else

ThreadIsComplete(thread)

end_if end Terminate

Abort_thread(thread)

Begin

If thread is waiting on a condition then

StopMonitoringCondition(thread)

end_if

If thread is waiting on an action then send abort to appropriate action engine end_if

If thread has children then set thread state to zombie and put on zombie queue

Forevery child_thread[thread]

Abort_thread(child_thread[thread])

end_forevery else

ThreadIsComplete(thread)

end_if end Abort_thread

SubmitActionsPolicies()

Begin

Forevery thread in the queue of actions and policies to be submitted

If the policy statement references the thread ID then update the submitter's local state table with the thread ID end_if

If the submittal is independent then

PolicyBodyIsComplete(submitter's thread)

end_if

If the submittal is of an action then notify the appropriate action engine of the action to be performed plus input parameter values else load the new policy enter the input parameter values into the submitted policy's state table set the thread state to ready and put in the current ready queue end_if end_forevery end SubmitActionsPolicies ProcessCompletedActionsPolicies()

Begin

Forevery message on the completed action policy queue get thread referenced in the message from the blocked queue If the submittal was not independent then update the submitter's state table with parameter values returned from the submittal end_if ThreadIsComplete(thread)

end_forevery end ProcessCompletedActionsPolicies

StartMonitoringCondition(thread)

Begin

Forevery identifier in the condition expression

If the identifier represents an asynchronous attribute then increment the reference count for the attribute If the reference count equals 1 then StartMonitoringAttribute(attribute)

end_if end_if end_forevery end StartMonitoringCondition

StopMonitoringCondition(thread)

Begin

Forevery identifier in the condition expression

If the identifier represents an asynchronous attribute then decrement the reference count for the attribute

If the reference count equals 0 then

StopMonitoringAttribute(attribute)

end_if end_if end_forevery end StopMonitoringCondition

StartMonitoringAttribute(attribute)

Begin determine the monitor responsible for monitoring this attribute increment the reference count for the monitor

If the reference count for the monitor equals 1 then establish a connection to the monitor end_if send a message to the monitor asking that the attribute be monitored end StartMonitoringAttribute

StopMonitoringAttribute(attribute)

Begin determine the monitor responsible for monitoring this attribute send a message to the monitor asking that the attribute not be monitored decrement the reference count for the monitor

If the reference count for the monitor equals 0 then close the connection to the monitor end_if end StartMonitoringAttribute

What is claimed is:

1. A computer network policy implementation system for causing network control operations to be performed in response to changes in state of the network comprising:

a policy editor having user interface through which a user may cause a set of policy instructions to be stored to define the network policy, said stored set of policy instructions setting forth operations to be performed in response to changes in state of the network;

network monitoring means for monitoring at least one of a predefined set of changes in the network and for providing system state signals indicative of said changes;

action engine means for selectively causing at least one of a predefined set of network control operations to be performed;

a policy interpreter, receptive of said stored set of policy instructions and communicating with said network monitoring means, for building at least one data structure to represent said stored set of policy instructions in relation to store said system state signals;

said policy interpreter implementing a predefined language having at least a first mechanism to specify that action should be initiated in response to a state signal, and a second mechanism to specify that action should be terminated in response to a state signal whether or not the action has been initiated;

said policy interpreter including an executor means for managing a plurality of threads each representing at least a portion of the policy instructions, the threads executing concurrently and interactively with one another;

said executor means communicating with said action engine means to cause network control operations to be performed in response to changes in state of the network in accordance with said stored set of policy instructions.

* * * * *